(12) United States Patent
Hirata et al.

(10) Patent No.: US 8,842,504 B2
(45) Date of Patent: Sep. 23, 2014

(54) NEAR-FIELD LIGHT HEAD AND INFORMATION RECORDING/REPRODUCING DEVICE

(75) Inventors: Masakazu Hirata, Singapore (JP); Manabu Oumi, Chiba (JP); Majung Park, Chiba (JP)

(73) Assignee: Seiko Instruments Inc., Chiba-Shi (JP)

( * ) Notice: Subject to any disclaimer, the term of this patent is extended or adjusted under 35 U.S.C. 154(b) by 922 days.

(21) Appl. No.: 12/668,076

(22) PCT Filed: Jul. 10, 2008

(86) PCT No.: PCT/JP2008/062525
§ 371 (c)(1),
(2), (4) Date: May 6, 2010

(87) PCT Pub. No.: WO2009/008488
PCT Pub. Date: Jan. 15, 2009

(65) Prior Publication Data
US 2011/0141861 A1    Jun. 16, 2011

(30) Foreign Application Priority Data
Jul. 10, 2007   (JP) .................................. 2007-181037

(51) Int. Cl.
*G11B 5/02*   (2006.01)
*G11B 5/60*   (2006.01)
*G11B 5/48*   (2006.01)
*G11B 5/31*   (2006.01)
*G11B 5/00*   (2006.01)

(52) U.S. Cl.
CPC ......... *G11B 5/314* (2013.01); *G11B 5/02* (2013.01); *G11B 5/6088* (2013.01); *G11B 2005/0021* (2013.01); *G11B 5/4866* (2013.01); *G11B 2005/001* (2013.01)
USPC ..................................... 369/13.13; 369/13.33

(58) Field of Classification Search
CPC .................. G11B 11/10554; G11B 2005/0021
See application file for complete search history.

(56) References Cited

U.S. PATENT DOCUMENTS

| 2002/0167870 A1 | 11/2002 | Akiyama et al. |
| 2005/0078565 A1 | 4/2005 | Peng et al. |

(Continued)

FOREIGN PATENT DOCUMENTS

| JP | 2002298302 | 10/2002 |
| JP | 2003006803 | 1/2003 |

(Continued)

OTHER PUBLICATIONS

International Search Report dated Sep. 16, 2008 issued in related International Patent Application No. PCT/JP2008/062525.

(Continued)

*Primary Examiner* — Srilakshmi K Kumar
*Assistant Examiner* — Carl Adams
(74) *Attorney, Agent, or Firm* — Grossman, Tucker, Perreault & Pfleger, PLLC

(57) ABSTRACT

A near-field light head of the present invention includes: a slider disposed opposite to a surface of the magnetic recording medium; a recording element that includes a main magnetic pole generating the recording magnetic field and a subsidiary magnetic pole, the recording element being fixed to an apical surface of the slider so that the main magnetic pole and the subsidiary magnetic pole line up in a longitudinal direction of the slider in the state where the subsidiary magnetic pole is located at the apical surface of the slider; a near-field light generating element, fixed adjacently to the main magnetic pole in a state where another end side thereof is directed to the magnetic recording medium, that propagates the light flux introduced from one end side thereof toward the other end side to generate the near-field light, and radiates the near-field light from the other end side to the outside; and a light flux introducing device, fixed to the slider, that introduces the light flux from the one end side into the near-field light generating element. The near-field light generating element includes an inclined surface, which is inclined with respect to an optical axis of the light flux propagated through the inside thereof and is opposite to the main magnetic pole, in the other end side. A metallic film that increases light intensity of the near-field light to be increased is formed in the inclined surface.

9 Claims, 22 Drawing Sheets

(56) References Cited

U.S. PATENT DOCUMENTS

| | | |
|---|---|---|
| 2006/0103982 A1 | 5/2006 | Nakamoto et al. |
| 2007/0096854 A1* | 5/2007 | Matsumoto et al. .......... 335/208 |
| 2007/0139818 A1* | 6/2007 | Shimazawa et al. .......... 360/126 |
| 2009/0316304 A1* | 12/2009 | Funayama et al. ......... 360/234.3 |

FOREIGN PATENT DOCUMENTS

| | | |
|---|---|---|
| JP | 2003272103 | 9/2003 |
| JP | 2004158067 | 6/2004 |
| JP | 20054901 | 1/2005 |
| JP | 2005116155 | 4/2005 |
| JP | 2006139873 | 6/2006 |
| JP | 2007164935 | 6/2007 |
| WO | 2007/074650 | 7/2007 |

OTHER PUBLICATIONS

Office Action from corresponding Japanese Appln. No. 2009-522678 dated Mar. 4, 2014. English translation attached.

* cited by examiner

NEAR-FIELD LIGHT HEAD AND INFORMATION RECORDING/REPRODUCING DEVICE

TECHNICAL FIELD

The invention relates to a near-field light head that records various types of information in ultra-high density on a magnetic recording medium using near-field light, and an information recording/reproducing device that includes this near-field light head.

BACKGROUND ART

In recent years, with capacity increase of hard disks and the like in computer devices, the recording density of information in single recording surfaces is increasing. For example, in order to increase the recording capacity per unit area of a magnetic disk, it is necessary to increase the surface recording density. However, as the recording density increases, the occupying recording area per one bit on a recording medium becomes reduced. If this bit size becomes reduced, since the energy that one bit information has becomes close to the thermal energy of room temperature, problems of heat demagnetization such as recorded information is inversed or diminished due to the thermal fluctuation occur.

The in-plane recording type that has been generally used is a magnetic recording type such that the direction of magnetization is directed to the in-plane direction of the recording medium. However, in this type, disappearance of recorded information by the above-mentioned heat demagnetization, and the like easily occur. Consequently, in order to solve such problems, the in-plane recording type is in a transition to the vertical recording type in which the magnetization signal is recorded in a direction perpendicular to the recording medium. In this recording type, magnetic information is recorded in a principle of moving single magnetization closer to the recording medium. According to this type, the recording magnetic field is nearly directed to the vertical direction with respect to the recording film. The information recorded with the vertical magnetic field keeps energetic stability easily since the N pole and the S pole hardly make a loop in the surface of the recording film. Therefore, this vertical recording type is strong against heat demagnetization in comparison to the in-plane recording type.

However, in recent years, there has been demand for the recording medium to have higher density in response to the need to perform recording/reproduction of larger and higher density information. Therefore, in order to suppress the influence between adjacent domains or thermal fluctuation to a minimum, a recording medium having strong coercivity has started to be adopted. Therefore, also with above-described vertical recording type, it has been difficult to record information on a recording medium.

Consequently, in order to solve this problem, a hybrid magnetic recording type (the near-field light assist magnetic record type) is provided in which the domain is locally heated by the near-field light to reduce coercivity temporarily, and writing is performed in the meantime. This hybrid magnetic recording type uses the near-field light that is generated by the near-field light generating element formed in the near-field light head. With use of this near-field light generating element, it becomes possible to handle optical information in a region that becomes equal to or less than the light wavelength, which has been the limit in conventional optical systems. Consequently, it is possible to achieve a high density of record bits surpassing conventional light information recording/reproducing devices and the like.

The near-field light generating element is constituted, for example, by an optically tiny opening, which is formed in a size equal to or less than the light wavelength, and surpasses the light diffraction limit, and a projection portion, which is formed in a nanometer size, and the like.

As the record head according to the above-described hybrid magnetic recording type, various types are provided. As one of the types, a near-field light head that tries to increase the recording density by reducing the size of light spots is known (for example, see Patent Documents 1 and 2).

This near-field light head mainly includes: a main magnetic pole; a subsidiary magnetic pole; a coil winding in which a conductor pattern of the screw shape is formed in the inside of an insulator; a metallic scatterer that generates the near-field light from irradiated laser light; a plane laser light source that irradiates the laser light toward the metallic scatterer; and a lens that focuses the irradiated laser light. Each of these components is attached to the lateral side of a slider that is fixed to the apex of the beam.

In the main magnetic pole, one end side thereof is a surface opposite to the recording medium, and the other end side thereof is connected to the subsidiary magnetic pole. That is to say, the main magnetic pole and the subsidiary magnetic pole constitute the single magnetization type vertical head in which one magnetic pole (single magnetization) is disposed in the vertical direction. In addition, the coil winding is fixed to the subsidiary magnetic pole such that a part of the coil winding passes between the magnetic pole and the subsidiary magnetic pole. The magnetic pole, the subsidiary magnetic pole and the coil winding constitute the electromagnet as a whole.

On the apex of the main magnetic pole, the above-mentioned metallic scatterer composed of gold and the like is attached. In addition, the above-mentioned plane laser light source is disposed in a position separated from the metallic scatterer, and the above-mentioned lens is disposed between this plane laser light source and the metallic scatterer.

Each of above-described components is attached in the order of the subsidiary magnetic pole, the coil winding, the main magnetic pole, the metallic scatterer, the lens and the plane laser light source from the lateral side of the slider.

In the case where the near-field light head constituted as described above is used, various types of information are recorded on a recording medium with generation of the near-field light and at the same time application of the recording magnetic field. That is, the laser light is irradiated from the plane laser light source. This laser light is collected by a lens, and irradiated to the metallic scatterer. Then, since inside free electrons are vibrated uniformly by the electric field of the laser light, plasmon is excited and the metallic scatterer generates the near-field light in the apex portion. As a result, the magnetic recording layer of the recording medium is locally heated by the near-field light, and coercivity is reduced temporarily.

In addition, with supply of the drive current to the conductor pattern of the coil winding at the same time as irradiation of the above-mentioned laser light, the recording magnetic field is locally applied with respect to the magnetic recording layer of the recording medium that is close to the main magnetic pole. By this, it is possible to record various types of information on a magnetic recording layer where the coercivity is temporarily reduced. That is to say, by cooperation of the near-field light and the magnetic field, it is possible to perform recording on a recording medium.

[Patent Document 1] Japanese Unexamined Patent Application, First Publication No. 2004-158067

[Patent Document 2] Japanese Unexamined Patent Application, First Publication No. 2005-4901

DISCLOSURE OF INVENTION

Technical Problem

However, the above-described conventional near-field light heads still have the problems described below.

That is, in generating the near-field light that is essential in recording information, the laser light is illuminated while being collected to the metallic scatterer via a lens from a plane laser light source. However, since the metallic scatterer is attached to the apex of the main magnetic pole, irradiation had to be performed with the optical axis of the laser oblique from the plane laser light source. Consequently, it was difficult to collect the laser light efficiently to the metallic scatterer even though the lens position is well positioned.

Particularly, a semicircular lens is used since the lens should be disposed in consideration of interference to the recording medium. However, this has also caused lowering of the light-collecting efficiency.

As a result, it has not been possible to efficiently generate the near-field light, and sometimes writing of information could not be performed.

In addition, since it is necessary to dispose the lens in a position separated from the metallic scatterer, the head size becomes large, and a compact constitution is not possible. Furthermore, since it is necessary to dispose the plane laser light source in consideration of the lens position and the position of the metallic scatterer, easy installation of the plane laser light source is not possible.

The invention has been made in consideration of these circumstances, and the object is to provide a near-field light head which can generate near-field light efficiently at a reduced size, and improve reliability of writing, and an information recording/reproducing device that has this near-field light head.

Technical Solution

The invention provides the followings in order to solve the above-mentioned problems and to achieve such an object.

(1) A near-field light head generates near-field light from introduced light flux to heat a magnetic recording medium rotating in a given direction, and gives rise to magnetization reversal by providing a recording magnetic field of a vertical direction with respect to the magnetic recording medium, to thereby cause information to be recorded. The near-field light head including: a slider disposed opposite to a surface of the magnetic recording medium; a recording element that includes a main magnetic pole generating the recording magnetic field and a subsidiary magnetic pole, the recording element being fixed to an apical surface of the slider so that the main magnetic pole and the subsidiary magnetic pole line up in a longitudinal direction of the slider in the state where the subsidiary magnetic pole is located at the apical surface of the slider; a near-field light generating element, fixed adjacently to the main magnetic pole in the state where an other end side thereof is directed to the magnetic recording medium, that propagates the light flux introduced from one end side thereof toward the other end side to generate the near-field light, and radiates the near-field light from the other end side to the outside; and a light flux introducing device, fixed to the slider, that introduces the light flux from the one end side into the near-field light generating element. The near-field light generating element includes an inclined surface, which is inclined with respect to an optical axis of the light flux propagated through the inside thereof and is opposite to the main magnetic pole, in the other end side, and a metallic film that increases the light intensity of the near-field light is formed in the inclined surface.

With the above-mentioned near-field light head, it is possible to perform recording of information with respect to the rotating magnetic recording medium by a hybrid magnetic recording type which makes the near-field light generated in the near-field light generating element and the recording magnetic field generated in the recording element cooperate with each other.

First, the slider is disposed in the state of being opposite to the surface of the magnetic recording medium. The recording element including the main magnetic pole and the subsidiary magnetic pole is fixed to the apical surface of this slider. At this time, the subsidiary magnetic pole is located at the apical surface side of the slider, and the main magnetic pole is disposed so as to be lined up adjacently to this subsidiary magnetic pole. Further, the near-field light generating element is fixed adjacently to the main magnetic pole. In other words, in the apical surface of the slider, the subsidiary magnetic pole, the main magnetic pole, and the near-field light generating element are arranged in this order from the slider side. In addition, the near-field light generating element is fixed with the other end side thereof, in which the near-field light is generated, being directed to the magnetic recording medium side. Therefore, one end side thereof, in which the light flux is introduced, is disposed in a position separated from the magnetic recording medium. The light flux introducing device fixed to the slider is connected to this one end side.

Here, when recording is performed, the light flux is introduced from one end side of the near-field light generating element to the inside by the light flux introducing device. Then, the introduced light flux is propagated through the inside toward the other end side which is located at the magnetic recording medium side. When the light flux progresses up to the vicinity of the other end side, the light flux is incident on the metallic film of the inclined surface which is formed in the state of being inclined with respect to the optical axis. Then, the surface plasmon is excited in this metallic film. The excited surface plasmon is propagated toward the other end side along the interface between the metallic film and the near-field light generating element while being augmented by the resonance effect, that is, along the inclined surface. At the point of time if the excited surface Plasmon reaches the other end side, the excited surface plasmon is leaked to the outside by the near-field light of which the light intensity is strong. In particular, this inclined surface is inclined in the state of being opposite to the main magnetic pole which is adjacent to the near-field light generating element, to thereby be directed to the other end side, and therefore, to approach the main magnetic pole. Therefore, similarly, the surface plasmon progressing along the inclined surface goes gradually toward the main magnetic pole as well. As a result, it is possible to generate the near-field light having the strong light intensity at a position very close to the main magnetic pole.

Then, the magnetic recording medium is locally heated by the generated near-field light, which results in the temporary reduction of coercivity. In particular, since the near-field light is generated at a position very close to the main magnetic pole as described above, it is possible to reduce the coercivity of the magnetic recording medium at the vicinity of the main magnetic pole.

On the other hand, simultaneously with the introduction of the light flux as described above, the recording magnetic field is generated between the main magnetic pole and the subsidiary magnetic pole by operating the recording element. Herewith, it is possible to generate the recording magnetic field with a pinpoint with respect to a local position of the magnetic recording medium of which the coercivity is reduced by the near-field light. This recording magnetic field has a change of direction in response to the recording information. When receiving the recording magnetic field, the magnetic recording medium has a change of direction of the magnetization in a vertical direction in response to the direction of this recording magnetic field. As a result, it is possible to perform recording of information.

In other words, it is possible to perform recording of information by the hybrid magnetic recording type which makes the near-field light and the recording magnetic field cooperate with each other. In addition, because of the vertical magnetic recording type, it is unlikely a phenomenon of heat fluctuation will occur, which allows a stable recording operation having a high reliability of writing to be performed. Moreover, it is possible to reduce the coercivity of the magnetic recording medium at a position very close to the main magnetic pole, to thereby allow a peak position of heating temperature to be inserted into a position where the recording magnetic field acts locally. Therefore, it is possible to perform recording more positively, and to achieve high density recording.

In addition, the light flux which is introduced by the light flux introducing device fixed to the slider is collected along the substantially straight optical axis toward the other end side directed to the magnetic recording medium and is propagated to thereby allow the near-field light to be generated. Therefore, the optical axes are not inclined as in the related art and lenses of which position adjustment is difficult are not needed. Thus, it is possible to efficiently generate the near-field light, and to efficiently heat the magnetic recording medium. On this point, it is also possible to improve the reliability of writing.

In addition, since the light flux is introduced by using the light flux introducing device, and then is propagated through the inside of the near-field light generating element, there is no case where the light flux is propagated through the air as in the related art. Consequently, it is possible to reduce light-guiding loss as much as possible. In addition, the recording element and the near-field light generating element are disposed in the apical surface of the outflow end side of the slider, to thereby prevent each of the components other than the light flux introducing device from being overlapped in the thickness direction of the slider as much as possible. Therefore, it is possible to achieve thinning through the compact design.

(2) It is preferable that the near-field light generating element includes: a core that propagates the light flux from the one end side to the other end side; and a clad that traps the core in the inside thereof with the other end side of the core being exposed.

In this case, since the near-field light generating element is constituted by the core and the clad, it is possible to achieve simplification of the configuration. In particular, since the clad traps the core in the inside thereof, the light flux propagated through the inside of the core from one end side toward the other end side is unlikely to be leaked to the outside. Therefore, it is possible to propagate the introduced light flux to the other end side without wasting the light flux, and to efficiently generate the near-field light.

(3) It is preferable to adopt a configuration where a groove portion exposing the core to the main magnetic pole side is formed in the clad, and the main magnetic pole includes a projecting portion which is in contact with the core via the groove portion.

In this case, since the main magnetic pole includes the projecting portion which is in contact with the core via the groove portion formed in the clad, it is possible to generate the near-field light in a position closer to the main magnetic pole. For this reason, it is possible to more efficiently make the near-field light and the recording magnetic field cooperate with each other. As a result, it is possible to achieve higher density recording.

(4) It is preferable that a shield film, which blocks at least one of electric or magnetic links, is formed between the projecting portion and the core in the state of being in close contact with the projecting portion and the core.

In this case, since the shield film is formed between the projecting portion and the core in the state of being in close contact with both (projecting portion and core), it is possible to block at least any one link of the electric or magnetic links of the core side and the main magnetic pole side to isolate them electrically or magnetically. In particular, it is possible to prevent the metallic film and the main magnetic pole from being in contact with each other via the core. Consequently, it is possible to make the near-field light and the recording magnetic field cooperate with each other as designed without being affected by the disturbance, and to perform stable recording by the hybrid magnetic recording type.

(5) It is preferable that the clad is formed in a state where one end side of the core is exposed to the outside.

In this case, since the clad is formed with one end side of the core being exposed to the outside, it is possible to directly introduce the light flux into the inside of the core without passing through the clad. For this reason, it is possible to introduce the light flux with loss being suppressed as much as possible. As a result, it is possible to further efficiently heat the magnetic recording medium.

(6) It is preferable to further include a reproducing element that outputs an electrical signal in response to the magnitude of the magnetic field leaked from the magnetic recording medium.

In this case, the reproducing element outputs an electrical signal in response to the magnitude of the magnetic field leaked from the magnetic recording medium. For this reason, it is possible to perform reproduction of information recorded on the magnetic recording medium on the basis of the electrical signal output from the reproducing element as well as the recording of information.

(7) It is preferable that the reproducing element is provided between the slider and the recording element.

In this case, since the reproducing element is provided between the slider and the recording element, the reproducing element, the recording element, and the near-field light generating element are lined up in this order from the apical surface of the slider. For this reason, even though the slider disposed opposite to the surface of the magnetic recording medium is inclined with the apical surface being directed to the magnetic recording medium side, it is possible to shift the recording element and the near-field light generating element as close as possible to the magnetic recording medium. Therefore, with respect to the magnetic recording medium, it is possible to cause the near-field light and the recording magnetic field to act more efficiently, and to perform high-density recording.

(8) It is preferable that the reproducing element is embedded in the near-field light generating element.

In this case, since the reproducing element is embedded in the near-field light generating element, it is possible to absorb the thickness of the reproducing element by the near-field light generating element. For this reason, even though the slider disposed opposite to the surface of the magnetic recording medium is inclined with the apical surface being directed to the magnetic recording medium side, it is possible to shift the recording element and the near-field light generating element as close as possible to the magnetic recording medium. Therefore, with respect to the magnetic recording medium, it is possible to cause the near-field light and the recording magnetic field to act more efficiently, and to perform high-density recording.

(9) In addition, an information recording/reproducing device includes: the near-field light head according to any one of the above (1) to (8); a beam that is capable of moving in a direction parallel to the surface of the magnetic recording medium, and supports the near-field light head in the apex side thereof in the state of being pivotally movable around two axes parallel to the surface of the magnetic recording medium and orthogonal to each other; an actuator that supports a base end side of the beam, and moves the beam toward a direction parallel to the surface of the magnetic recording medium; a rotary drive section that rotates the magnetic recording medium in a given direction; and a control section that controls an incident timing of the light flux and the recording element.

With the above-mentioned information recording/reproducing device, after the magnetic recording medium is rotated in a given direction by the rotary drive section, the beam is moved by the actuator to thereby cause the near-field light head to perform a scanning operation. The near-field light head is then disposed in a desired position on the magnetic recording medium. At this time, the near-field light head is supported on the beam so as to be capable of pivotally moving around two axes parallel to the surface of the magnetic recording medium and orthogonal to each other, that is, capable of rotating around the two axes. Consequently, even though undulation occurs in the magnetic recording medium, it is possible to absorb the change of wind pressure caused by the undulation or the change of undulation transmitted directly, by twisting, and to make the posture of the near-field light head stable.

After that, the recording element is operated by the control section and the light flux is introduced into the near-field light generating element. Herewith, the near-field light head makes the near-field light and the recording magnetic field cooperate with each other, to thereby allow information to be recorded on the magnetic recording medium. In particular, since the information recording/reproducing device includes the above-mentioned near-field light head, it is possible to provide a high reliability of writing, obtain high density recording, and achieve a high quality. In addition, compactness and thinning can be achieved simultaneously.

Advantageous Effects

With the near-field light head according to the invention, it is possible to efficiently generate the near-field light from the light flux, and to improve the reliability of writing. Moreover, since near-field light having strong light intensity is generated in a position very close to the main magnetic pole, it is possible to obtain high density recording. In addition, it is possible to achieve compactness and thinning of the whole size.

In addition, with the information recording/reproducing device according to the invention, since the above-mentioned near-field light head is included, it is possible to provide a high reliability of writing, obtain high density recording, and achieve a high quality. In addition, compactness and thinning can be achieved simultaneously.

EXPLANATION OF REFERENCES

D: DISK (MAGNETIC RECORDING MEDIUM)
D1: DISK SURFACE (SURFACE OF MAGNETIC RECORDING MEDIUM)
L: LIGHT FLUX
L1: LASER LIGHT (LIGHT FLUX)
R: NEAR-FIELD LIGHT
1: INFORMATION RECORDING/REPRODUCING DEVICE
2, 50, 60, 70, 80, 90, 95, 97, 100, 110, 120: NEAR-FIELD LIGHT HEAD
3: BEAM
4: OPTICAL WAVEGUIDE (LIGHT FLUX INTRODUCING DEVICE)
6: ACTUATOR
7: SPINDLE MOTOR (ROTARY DRIVE SECTION)
8: CONTROL SECTION
20: SLIDER
21: RECORDING ELEMENT
22, 102, 112, 122: SPOT-SIZE CONVERTER (NEAR-FIELD LIGHT GENERATING ELEMENT)
23: REPRODUCING ELEMENT
30: SUBSIDIARY MAGNETIC POLE
32: MAIN MAGNETIC POLE
32a: PROJECTING PORTION OF MAIN MAGNETIC POLE
40, 101, 111, 121: CORE
40d: INCLINED SURFACE
41: CLAD
41b: GROOVE PORTION OF CLAD
42: METALLIC FILM
51: SHIELD FILM
96: LASER LIGHT SOURCE (LIGHT FLUX INTRODUCING DEVICE)

BEST MODE FOR CARRYING OUT THE INVENTION (First Embodiment)

Hereinafter, the first embodiment according to the invention will be described with reference to FIG. 1 to FIG. 8. An information recording/reproducing device 1 according to the embodiment is a device which performs a writing operation with a vertical recording type with respect to a disk (magnetic recording medium) D having a vertical recording layer d2.

In addition, an air float type will be described for example, in which a near-field light head 2 is floated by using the flow of air when the disk D rotates.

Figure 1:
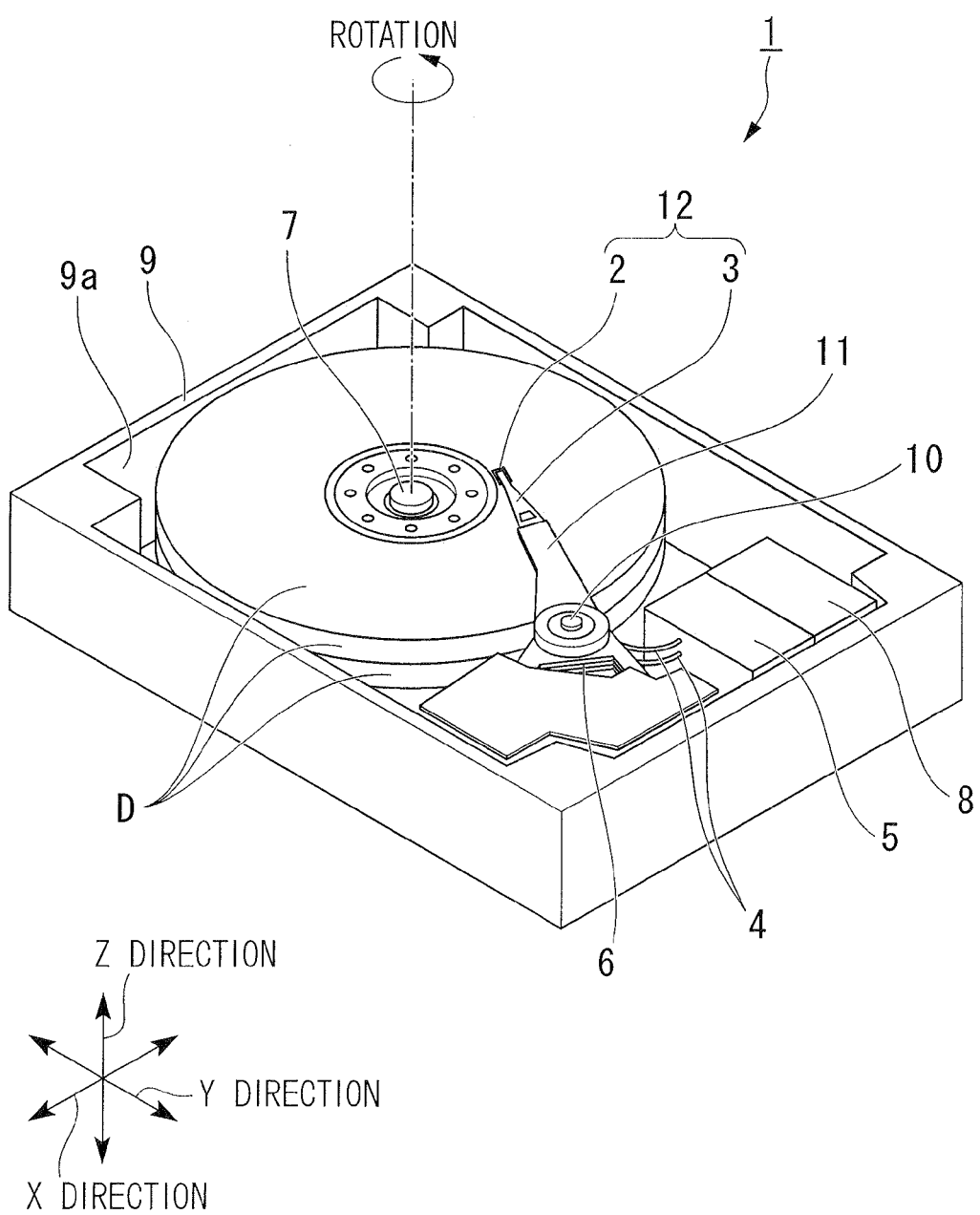
FIG. 1 is a diagram showing a first embodiment according to the invention, and is a configuration diagram of an information recording/reproducing device.

As shown in FIG. 1, the information recording/reproducing device 1 according to the embodiment includes: a near-field light head 2 having a spot-size converter (near-field light generating element) 22 described later; a beam 3 which is capable of moving in an XY direction parallel to a disk surface (surface of a magnetic recording medium) D1, and supports the near-field light head 2 in the apex side thereof in the state of being pivotally movable around two axes (X axis and Y axis) parallel to the disk surface D1 and orthogonal to each other; a light signal controller (light source) 5 which makes light flux L incident with respect to an optical waveguide 4 (light flux introducing device) from the base end side of the optical waveguide 4; an actuator 6 which supports the base end side of the beam 3, and moves this beam 3 in a scanning manner toward an XY direction parallel to the disk surface D1; a spindle motor (rotary drive section) 7 which rotates the disk D in a given direction; a control section 8 which supplies current modulated in accordance with information to a coil 33 described later, and controls incident timing of the light flux L by controlling an operation of the light signal controller 5; and a housing 9 which accommodates these components in the inside thereof.

The housing 9 is formed of metallic materials such as aluminum in a square shape when viewed in a top view, and is configured so that a concave portion 9a for receiving each of the components in the inside thereof is formed. In addition, a lid, which is not shown, is removably fixed to the housing 9 so as to cover an opening of the concave portion 9a. The above-mentioned spindle motor 7 is attached substantially to the center of the concave portion 9a, and the disk D is removably fixed by fitting a central hole in this spindle motor 7. The above-mentioned actuator 6 is attached to a corner of the concave portion 9a. A carriage 11 is attached to this actuator 6 via a bearing 10, and a beam 3 is attached to the apex of this carriage 11. The carriage 11 and the beam 3 are capable of moving in an XY direction by driving of the actuator 6.

The carriage 11 and the beam 3 are retreated from the top of the disk D by driving of the actuator 6 when the rotation of the disk D is stopped. A suspension 12 is constituted by the near-field light head 2 and the beam 3. The light signal controller 5 is attached to the inside of the concave portion 9a so as to be adjacent to the actuator 6. The control section 8 is attached adjacently to the actuator 6.

Figure 2:
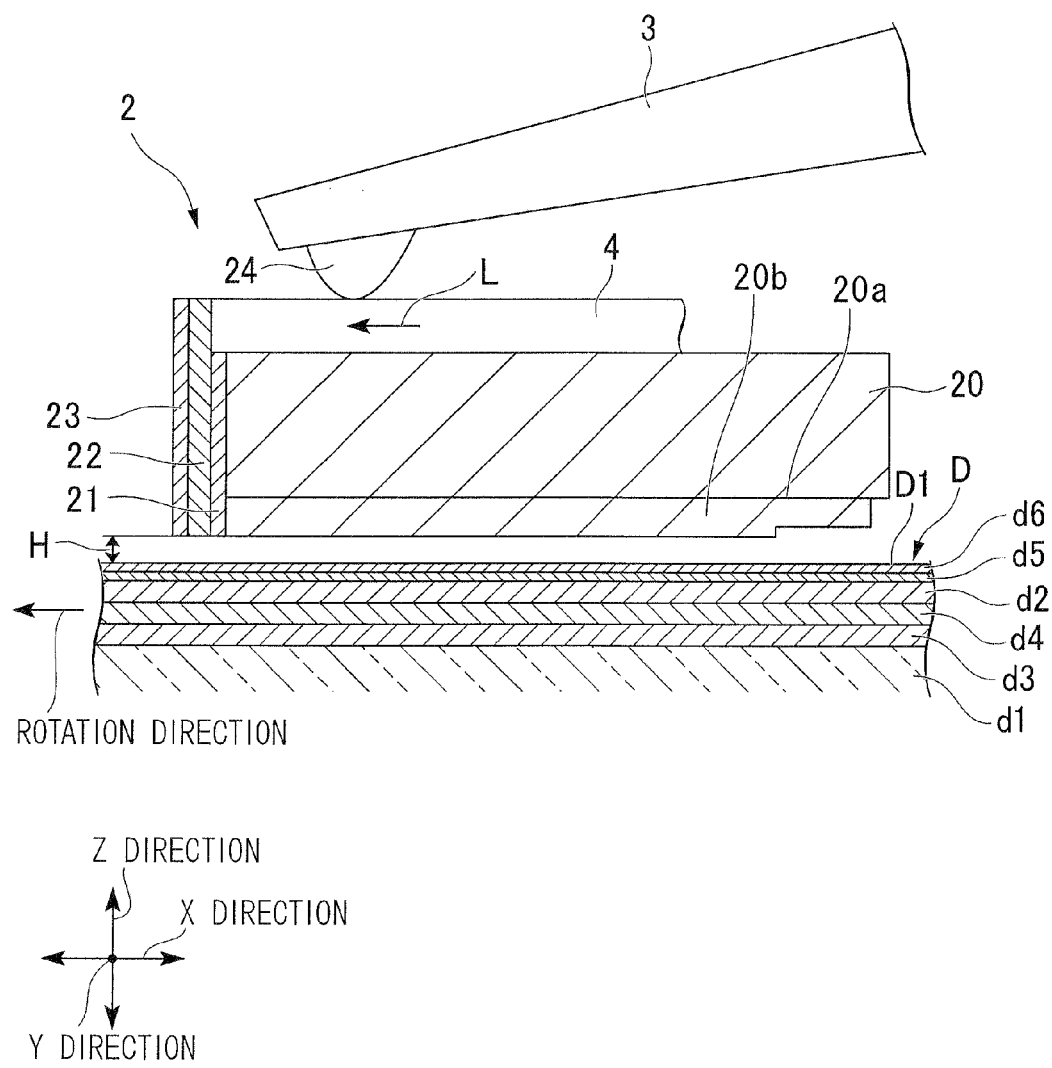
FIG. 2 is an enlarged cross-section view of a near-field light head shown in FIG. 1.
Figure 3:
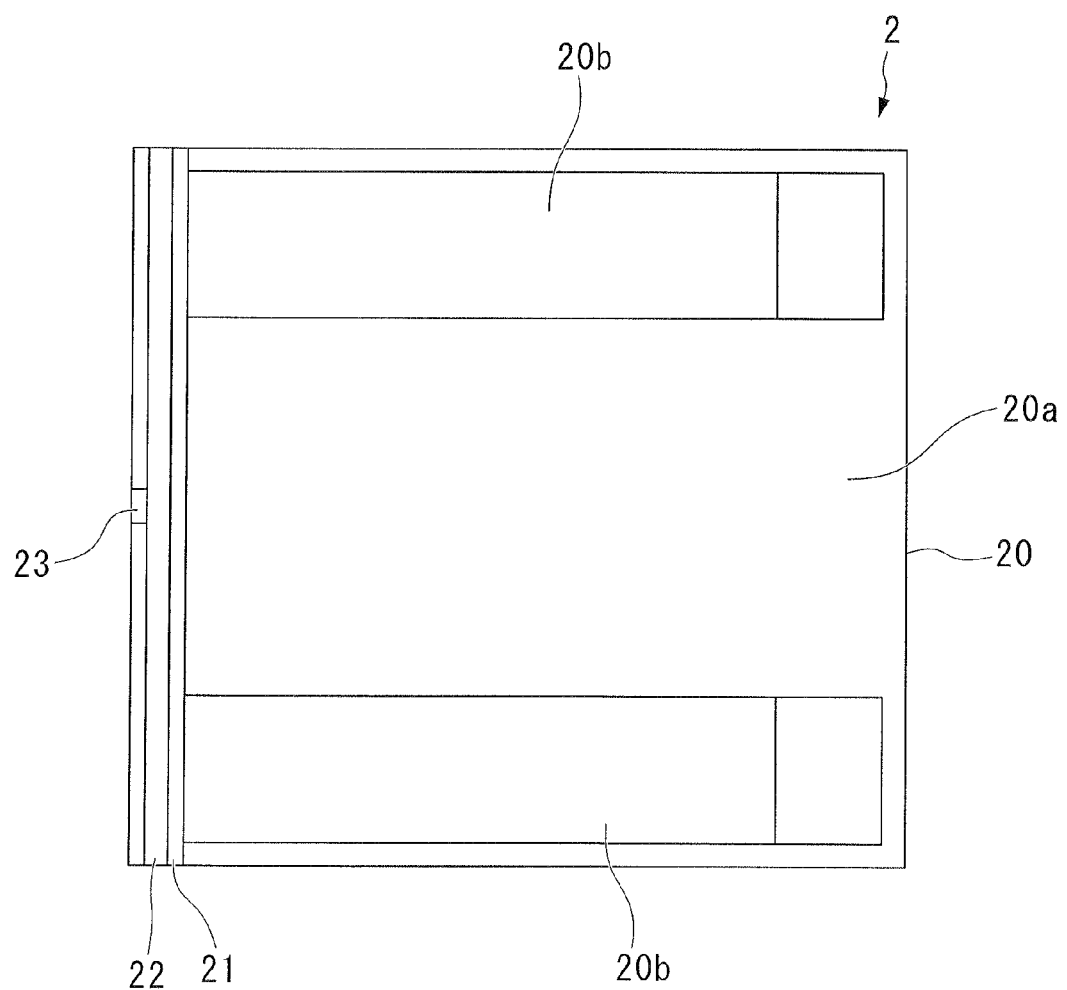
FIG. 3 is a diagram of the near-field light head shown in FIG. 2 when viewed from the disk surface side.

The above-mentioned near-field light head 2 heats the rotating disk D, and gives rise to magnetization reversal by providing a recording magnetic field of a vertical direction with respect to the disk D, to thereby cause information to be recorded. As shown in FIG. 2 and FIG. 3, this near-field light head 2 is disposed opposite to the disk D in a state being floated by a predetermined distance H from the disk surface D1. The near-field light head 2 includes: a slider 20 having an opposite surface 20*a* opposite to the disk surface D1; a recording element 21 fixed to the apical surface of this slider 20 (represented below as the lateral surface of the outflow end side); a spot-size converter 22 fixed adjacently to this recording element 21; and the optical waveguide 4 introducing the light flux L from the light signal controller 5 into a core 40, which is described later, of this spot-size converter 22. In addition, the near-field light head 2 according to the embodiment includes a reproducing element 23 fixed adjacently to the spot-size converter 22.

The above-mentioned slider 20 is formed of light transmissive materials such as silica glass, or of ceramics such as AlTiC (aluminium titanium carbide) in a rectangular parallelepiped shape. This slider 20 is supported so as to dangle from the apex of the beam 3 via a gimbal portion 24 in a state where the opposite surface 20*a* of the slider 20 is set to the disk D side. This gimbal portion 24 is a component of which the movement is regulated so as to be displaced only around the X axis and the Y axis. Herewith, the slider 20 is rotatable around two axes (X axis and Y axis) parallel to the disk surface D1 and orthogonal to each other as described above.

A convex line portion 20*b* which generates floating pressure from the viscosity of the flow of air arising from the rotating disk D is formed on the opposite surface 20*a* of the slider 20. In the embodiment, two convex line portions 20*b*, for example, extended along a longitudinal direction so as to line up in a rail shape are formed. However, the embodiment is not limited to this case, and may be in any concave-convex shape if the slider 20 is designed to be floated in the optimal state by adjusting the positive pressure at which the slider 20 is separated from the disk surface D1, and the negative pressure at which the slider 20 is attracted to the disk surface D1. The surface of this convex line portion 20*b* becomes a surface called ABS (Air Bearing Surface).

The slider 20 receives a force which causes it to float from the disk surface D1 by these two convex line portions 20*b*. In addition, the beam 3 is configured to bend in a Z direction perpendicular to the disk surface D1, and absorbs a floating force of the slider 20. In other words, the slider 20 receives a force pressed to the disk surface D1 side by the beam 3 when floating. Consequently, the slider 20 is floated by the balance of the forces of both of these in the state of being separated by a predetermined distance H from the disk surface D1 as described above. Moreover, the slider 20 is configured to pivotally move around the X axis and the Y axis by the gimbal 24, to thereby be floated with the posture thereof being constantly stable.

After the flow of air occurring in accordance with the rotation of the disk D flows in from the inflow end side (base end side of the beam 3) of the slider 20, it flows along the ABS, and exits from the outflow end side (apex side of the beam 3) of the slider 20.

Figure 4:
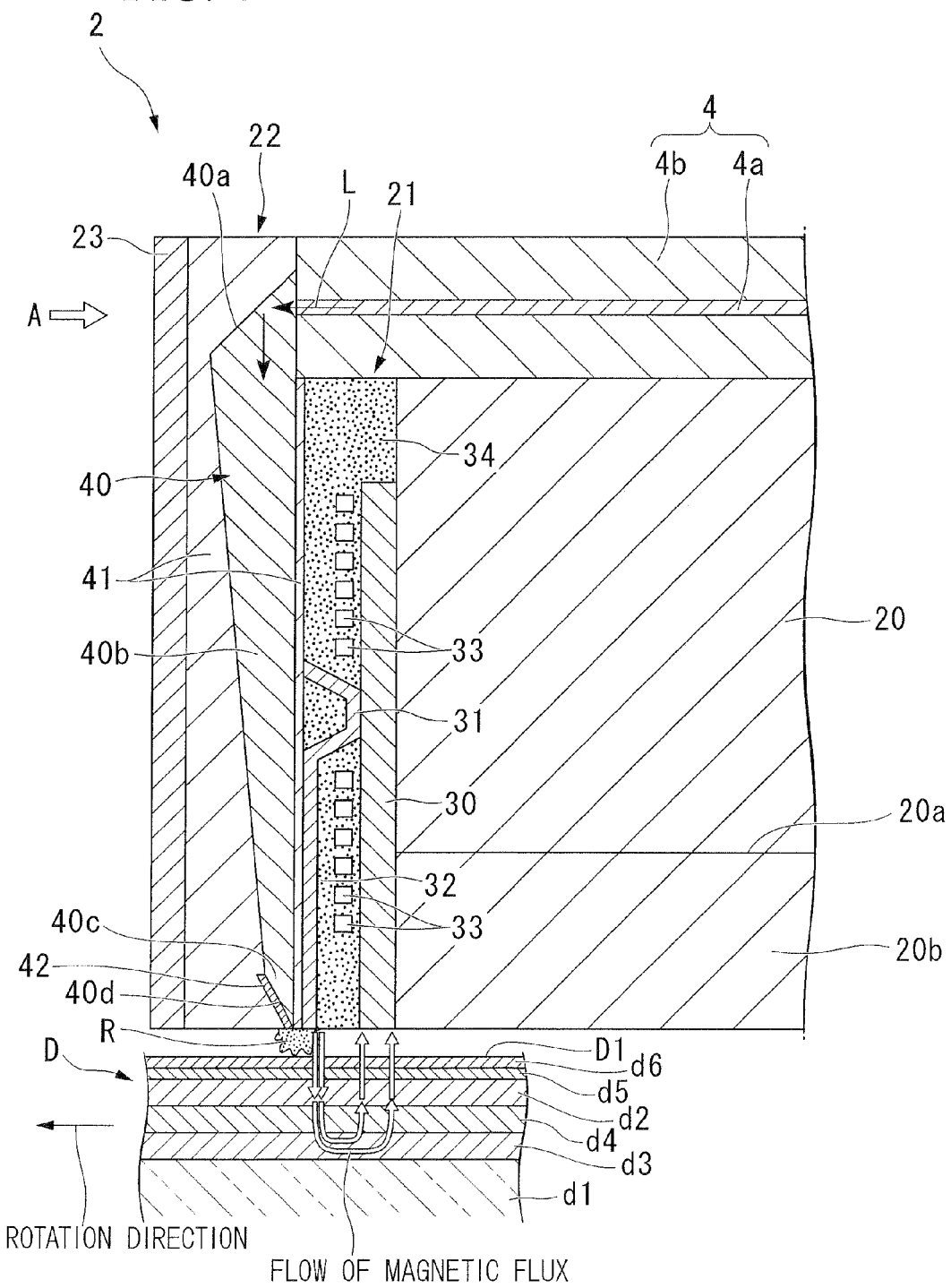
FIG. 4 is an enlarged cross-section view of the lateral surface of the outflow end side of the near-field light head shown in FIG. 2, and is a diagram showing the configurations of a near-field light generating element and a recording element, and showing a relationship between near-field light and magnetic field when recording is performed.

As shown in FIG. 4, the above-mentioned recording element 21 includes: a subsidiary magnetic pole 30 fixed to the lateral surface of the outflow end side of the slider 20; a main magnetic pole 32, connected to the subsidiary magnetic pole 30 via a magnetic circuit 31, that generates a recording magnetic field perpendicular with respect to the disk D between the subsidiary magnetic pole 30 and the main magnetic pole 32; and a coil 33 which spirally winds the periphery of the magnetic circuit 31 around the magnetic circuit 31. In other words, from the outflow end side of the slider 20, the subsidiary magnetic pole 30, the magnetic circuit 31, the coil 33, and the main magnetic pole 32 are disposed in this order so as to be lined up in a longitudinal direction of the slider 20.

Both of the magnetic poles 30 and 32 and the magnetic circuit 31 are formed of a material having high-saturated magnetic flux density (Bs) (for example, CoNiFe alloy, CoFe alloy and the like). In addition, the coil 33 is disposed such that the gap is arranged between adjacent coil lines, between the coil 33 and the magnetic circuit 31, and between the two magnetic poles 30 and 32 so as not to be short-circuited, and molded in this state by the insulating material 34. Then, the coil 33 is supplied with the current, which is modulated in response to the information, from the control section 8. That is, the magnetic circuit 31 and the coil 33 constitute the electromagnet as a whole. In addition, the main magnetic pole 32 and the subsidiary magnetic pole 30 are designed such that the end surface opposite to the disk D is flush with the ABS of the slider 20.

Figure 5:
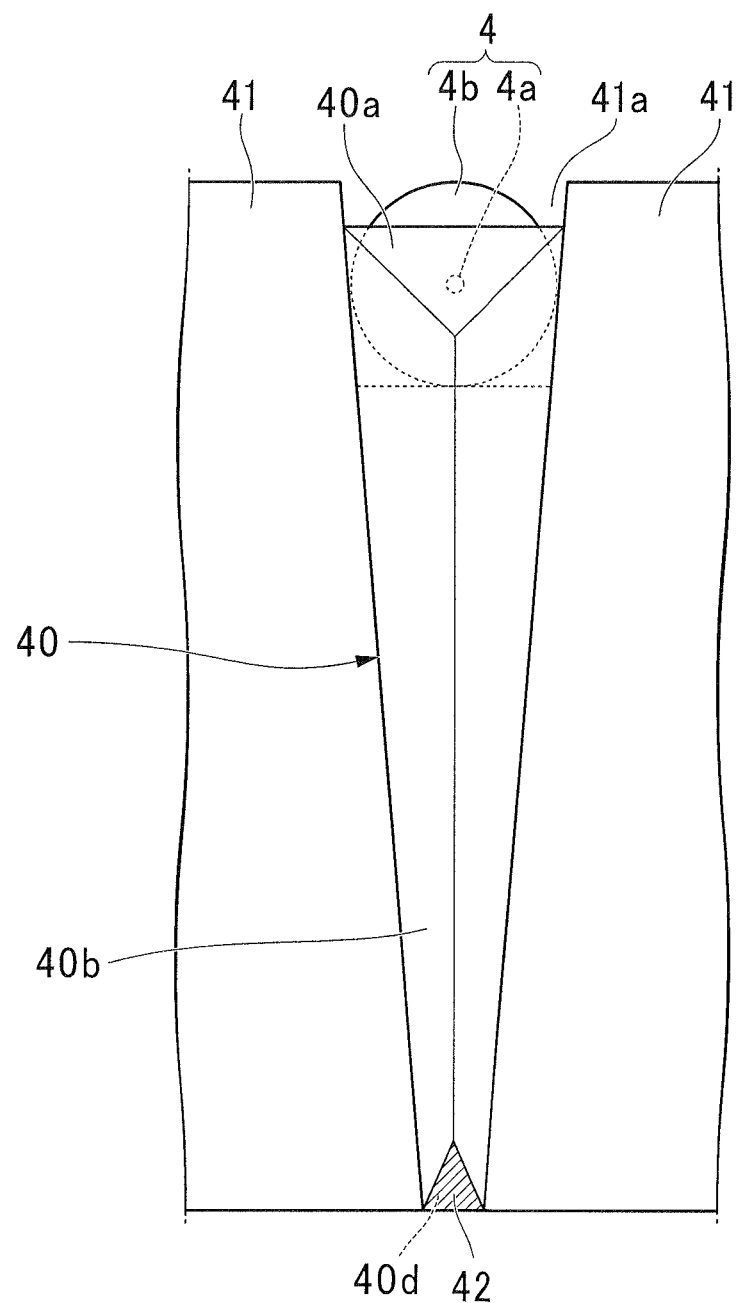
FIG. 5 is a diagram of a core of the near-field light generating element shown in FIG. 4 when viewed from a direction of arrow A.

As shown in FIGS. 4 and 5, the above-mentioned spot-size converter 22 is fixed adjacently to the recording element 21 in a state where one end side of the spot-size converter 22 is toward the upper side of the slider 20, and the other end side of the spot-size converter 22 is toward the disk D side. More specifically, the above-mentioned spot-size converter 22 is fixed adjacently to the main magnetic pole 32. FIG. 5 is a diagram of the core 40 described below when viewed from the direction of the arrow A shown in FIG. 4.

This spot-size converter 22 is an element that generates the near-field light R from the light flux L introduced from the one end side of the spot-size converter 22, and radiates the generated near-field light R from the other end side to the outside. The spot-size converter 22 includes the polyhedron core 40 and the clad 41 that traps this core 40 into the inside as shown in FIGS. 4 to 8, and formed substantially in a plate shape as a whole.

Figure 6:
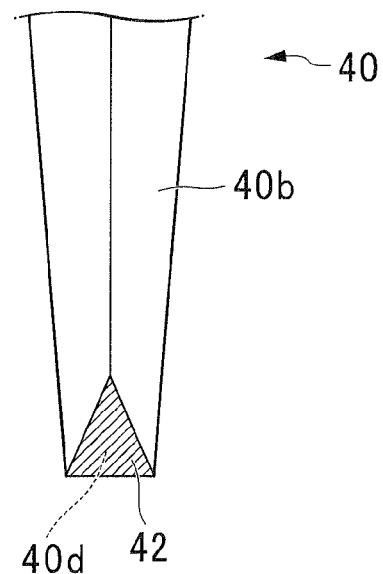
FIG. 6 is an enlarged view of the other end side of the core shown in FIG. 5.
Figure 7:
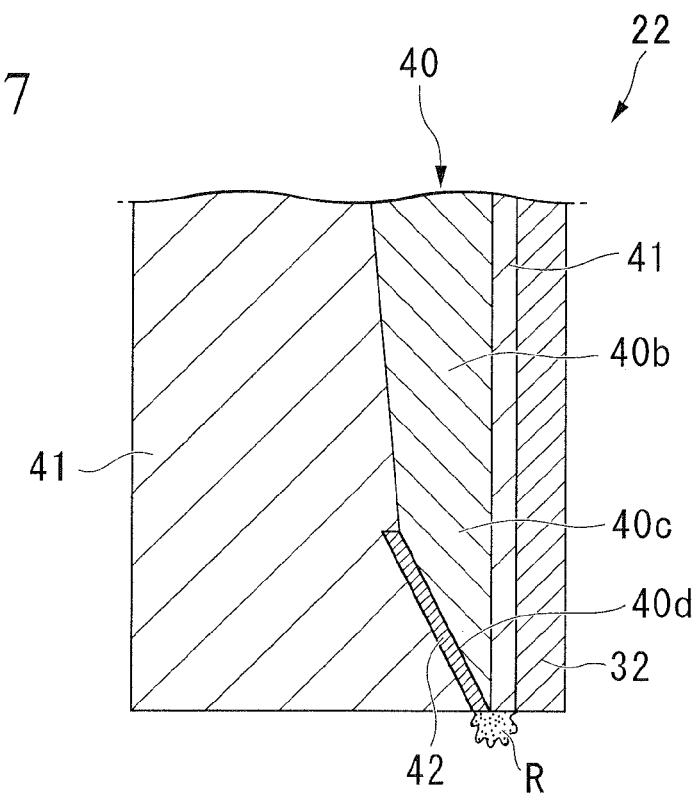
FIG. 7 is an enlarged cross-section view of the other end side of the near-field light generating element shown in FIG. 4.
Figure 8:
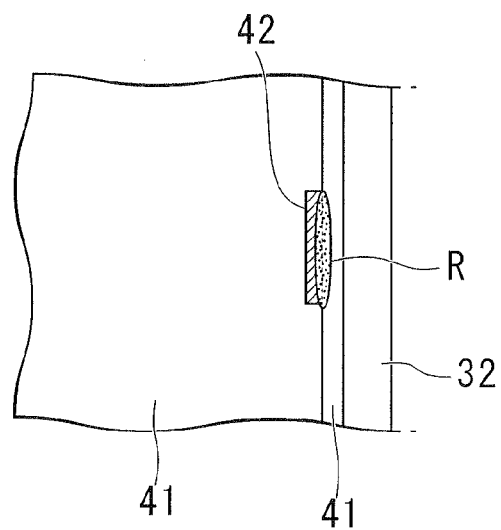
FIG. 8 is a diagram of the near-field light generating element shown in FIG. 4 when viewed from the disk side.

FIG. 6 is an enlarged view of the periphery of the other end side of the core 40 shown in FIG. 5; FIG. 7 is an enlarged view of the periphery of the other end side of the spot-size converter 22 shown in FIG. 4; and FIG. 8 is a diagram of the spot-size converter 22 shown in FIG. 4 when viewed from the disk D side.

The above-mentioned core 40 propagates the light flux L introduced from one end side of the core 40, toward the other end side of the core 40 to generate the near-field light R, and radiates this near-field light R from the other end side to the outside. In the present embodiment, a core is described for example, which is formed to be gradually squeezed as a whole from the one end side toward the other end side. That is, the core 40 of the present embodiment is formed integrally by the reflecting surface 40*a*, the light flux collecting portion 40*b* and the near-field light generating portion 40*c*, and formed to be gradually squeezed as a whole from the one end side toward the other end side. The light flux collecting portion 40*b* is formed to have three lateral surfaces, and one lateral surface thereof is disposed to be opposite to the main magnetic pole 32.

The reflecting surface 40*a* reflects the light flux L, which is introduced by the optical waveguide 4 from the one end side of the core 40, to a different direction from the introduction direction. In the embodiment, the reflecting surface 40*a* reflects the direction of the light flux L so as to change substantially by 90 degrees. In addition, the light flux collecting portion 40b is a portion that is formed to be gradually squeezed in the direction from the one end side toward the other end side, and propagates the light flux L reflected by the reflecting surface 40a toward the other end side while collecting it. In other words, the light flux collecting portion 40b can squeeze the spot size of the introduced light flux L to a small size.

The near-field light generating portion 40c is a portion that is formed to be further squeezed from the end portion of the light flux collecting portion 40b toward the other end side of the core 40. Specifically, in the vicinity of the other end side of the core 40, the near-field light generating portion 40c is formed to be squeezed by the inclined surface 40d that is formed to be opposite to the main magnetic pole 32, as inclined to the optical axis of the light flux L propagating in the inside of the core 40. By this inclined surface 40d, the other end side of the core 40 is in the pointed state. Therefore, as shown in FIG. 8, the other end side of the core 40 is linearly exposed along the clad 41 that is in contact with the main magnetic pole 32.

Moreover, on this inclined surface 40d, a metallic film 42 is formed on the whole surface, which augments the light intensity of the near-field light R. Such metallic film 42 is, for example, a gold film, a silver film, a platinum film and the like. Particularly, the metallic film 42 is preferably a gold film since it is strong against oxidation and excellent in durability.

As shown in FIGS. 4 and 5, the above-mentioned clad 41 is formed of a material that has a lower refractive index than that of the core 40, and in close contact with the core 40 in the state where at least the other end side of the core 40 is exposed to the outside, to trap the core 40 to the inside. Consequently, a gap does not occur between the core 40 and the clad 41. In addition, the clad 41 of the present embodiment is designed such that the groove portion 41a is formed in one end side of the core 40, and a part of one end side of the core 40 is exposed to the outside.

One example of the combinations of the materials used as the clad 41 and the core 40 is described, for example, a combination is considered wherein the core 40 is formed with silica ($SiO_2$), and the clad 41 is formed with silica doped with fluorine. In this case, when the wavelength of the light flux L is 400 nm, the refractive index of the core 40 is 1.47, and the refractive index of the clad 41 is less than 1.47, and thus this combination is preferable. In addition, a combination is considered wherein the core 40 is formed with silica doped with germanium, and the clad 41 is formed with silica ($SiO_2$). In this case, when the wavelength of the light flux L is 400 nm, the refractive index of the core 40 is more than 1.47, and the refractive index of the clad 41 is 1.47, and thus this combination is preferable.

Particularly, since the force trapping the light flux L into the core 40 becomes large as much as the difference between the refractive indexes of the core 40 and the clad 41, the difference between the two refractive indexes is more preferably enhanced using tantalum oxide ($Ta_2O_5$: the refractive index is 2.16 when the wavelength is 550 nm) for the core 40, and using silica and the like for the clad 41. In addition, in the case of utilizing the light flux L of the infrared region, it is also effective to form the core 40 with silicon (Si: the refractive index is about 4), which is a transparent material with respect to infrared light.

As shown in FIGS. 4 and 5, the above-mentioned optical waveguide 4 is a biaxial waveguide composed of the core 40 and the clad 41, and the light flux L propagates in the inside of the core 40. This optical waveguide 4 is fixed as fitted into the groove portion 41a formed in the clad 41, and the groove portion (not shown) formed on the upper surface of the slider 20. By this configuration, the optical waveguide 4 becomes disposed in parallel to the slider 20.

The apex of the optical waveguide 4 is connected to the one end side of the spot-size converter 22, and introduces the light flux L into the core 40. In addition, the base end side of the optical waveguide 4 is drawn to the light signal controller 5 via the beam 3, the carriage 11 and the like, and then connected to this light signal controller 5.

As shown in FIG. 5, the positional relationship of the spot-size converter 22 and the optical waveguide 4 is adjusted such that the light flux L, which is introduced into the core 40 from the optical waveguide 4, is incident substantially on the center of the reflecting surface 40a.

In addition, the above-mentioned reproducing element 23 is a magnetoresistive effect film that has an electrical resistance changing in response to the magnitude of the magnetic field leaking from the vertical recording layer d2 of the disk D. This reproducing element 23 is supplied with the bias current from the control section 8 via a lead film (not shown) and the like. By this configuration, the control section 8 can detect a change of the magnetic field leaked from the disk D as a change of the voltage, and perform signal reproduction from this variation of voltage.

The disk D of the present embodiment uses a vertical two-layer film disk comprising at least of the two layers of the vertical recording layer d2, which has an easy magnetization axis in a direction perpendicular to the disk surface D1, and the soft magnetic layer d3 composed of materials having high magnetic permeability. As such disk D, for example, the soft magnetic layer d3, the intermediate layer d4, the vertical recording layer d2, the protective layer d5 and the lubricating layer d6 are formed in this order on the substrate d1 is used as shown in FIG. 2.

As such substrate d1, for example, an aluminum substrate, a glass substrate and the like is used. The soft magnetic layer d3 is a layer having high magnetic permeability. The intermediate layer d4 is a layer controlling the crystal of the vertical recording layer d2. The vertical recording layer d2 is a vertical anisotropic magnetic layer, and, for example, CoCrPt alloy is used for it. The protective layer d5 is one for protecting the vertical recording layer d2, and thus, for example, DLC (diamond-like carbon) film is used for it. For the lubricating layer d6, for example, a fluorine liquid lubricating material is used.

Next, the case of recording and reproducing various types of information on the disk D by the information recording/reproducing device 1 constituted as described above, will be described below.

First, the spindle motor 7 is driven to rotate the disk D in a given direction. Next, the actuator 6 is operated to scan the beam 3 in an XY direction via the carriage 11. By this operation, the near-field light head 2 can be positioned in a desired position on the disk D as shown in FIG. 1. At this time, the near-field light head 2 receives the floating force by two convex line portions 20b formed on the surface 20a opposite to the slider 20, and is pressed with a predetermined force on the disk D side by the beam 3 and the like. The near-field light head 2 floats to a distant position by a predetermined distance H from the upper side of the disk D by the balance of these two forces as shown in FIG. 2.

In addition, even if the near-field light head 2 receives wind pressure generated due to undulation of the disk D, displacement in the Z direction is absorbed by the beam 3, and at the same time, can be displaced to rotation of the XY axis by the gimbal 24, and thus the wind pressure caused by undulation can be absorbed. Therefore, the near-field light head 2 can be floated in the stable state.

Here, when the recording of information is performed, the control section 8 operates the light signal controller 5, and supplies a current modulated in response to the information to the coil 33.

First, the light signal controller 5 receives instructions from the control section 8 to cause the light flux L to be incident from the base end side of the optical waveguide 4. The incident light flux L progresses toward the apex side in the core 40 of the optical waveguide 4, and is introduced from one end side of the spot-size converter 22 into the core 40, as shown in FIG. 4. At this time, the light flux L is introduced into the core 40 in a direction parallel to the slider 20. Then, the introduced light flux L is reflected from the reflecting surface 40*a* so that the direction thereof changes by about 90°. The direction-changed light flux L is collected by the light flux collecting portion 40*b* and propagated toward the other end side located at the disk D side to be incident on the near-field light generating portion 40*c*.

In this case, the light flux collecting portion 40*b* is formed to be gradually squeezed from one end side toward the other end side. Therefore, when the light flux L passes through this light flux collecting portion 40*b*, the light flux L is gradually collected on the lateral surface with repetition of the reflection to propagate in the core 40. Particularly, since the clad 41 is in close contact with the lateral surface of the core 40, it is possible to propagate the introduced light flux L to the other end side with being squeezed without wasting it and without leaking the light to the outside of the core 40. In addition, the light flux L is gradually squeezed as it propagates so that the spot size becomes small.

The light flux L having reduced spot size is subsequently incident on the near-field light generating portion 40*c*. Then, the light flux L is incident on the metallic film 42 of the inclined surface 40*d* formed as inclined with respect to the optical axis. By this, the surface plasmon is excited on the metallic film 42. The excited surface plasmon propagates toward the other end side of the core 40 along the interface of the metallic film 42 and the core 40 (specifically, the near-field light generating portion 40*c*), that is, along the inclined surface 40*d* with being augmented by the resonance effect. Then, at the time when the excited surface plasmon reaches the other end side, the excited surface plasmon becomes the near-field light R that has strong light intensity, and is leaked to the outside.

In particular, since this inclined surface 40*d* is inclined as opposite to the main magnetic pole 32 that is adjacent to the spot-size converter 22, this inclined surface 40*d* is closer to the main magnetic pole 32 as it is toward the other end side of the core 40. Therefore, the surface plasmon that progresses along the inclined surface 40*d* also goes gradually toward the main magnetic pole 32. As a result, as shown in FIG. 8, it is possible to generate the near-field light R having strong light intensity in a position very close to the main magnetic pole 32, as localized in the interface of the metallic film 42 and the near-field light generating portion 40*c*. The disk D is locally heated by this near-field light R so that the coercivity is temporarily reduced. Particularly, as described above, since the near-field light R is generated in a position very close to the main magnetic pole 32, it is possible to reduce the coercivity of the disk D in the vicinity of the main magnetic pole 32.

On the other hand, as described above, if the coil 33 is supplied with the current by the control section 8 simultaneously with the introduction of the light flux L, the current magnetic field generates the magnetic field in the magnetic circuit 31 by the principle of the electromagnet, and thus it is possible to generate the recording magnetic field in the vertical direction with respect to the disk D between the main magnetic pole 32 and the subsidiary magnetic pole 30. Then, as shown in FIG. 4, the magnetic flux generated from the main magnetic pole 32 side, straightly passes through the vertical recording layer d2 of the disk D to reach the soft magnetic layer d3. By this, it is possible to perform recording in the state where magnetization of the vertical recording layer d2 is directed vertically with respect to the disk surface D 1. In addition, the magnetic flux that has reached to the soft magnetic layer d3 returns to the subsidiary magnetic pole 30 via this soft magnetic layer d3. When the magnetic flux returns to the subsidiary magnetic pole 30, it has no influence on the direction of magnetization. This is because the area of the subsidiary magnetic pole 30 opposite to the disk surface D1 is larger than that of the main magnetic pole 32, and thus a force enough to reverse the magnetization to have high magnetic flux density is not generated. In other words, it is possible to perform recording only on the main magnetic pole 32 side.

As a result, it is possible to perform recording of information by the hybrid magnetic recording type which makes the near-field light R and the recording magnetic field generated by both of the magnetic poles 30 and 32 cooperate with each other. Moreover, since the recording is performed by a vertical recording type, it is difficult to receive the effect such as the phenomenon of heat fluctuation, to thereby allow a stable recording operation. Consequently, it is possible to raise reliability of writing.

In particular, it is possible to reduce the coercivity of the disk D at a position very close to the main magnetic pole 32, to thereby allow a peak position of heating temperature to be inserted into a position where the recording magnetic field acts locally. Therefore, it is possible to perform the recording positively, and to achieve improvement in reliability and achieve high density recording.

Next, when the information recorded on the disk D is reproduced, the reproducing element 23 fixed adjacently to the spot-size converter 22 receives the magnetic field leaked from the vertical recording layer d2 of the disk D, and the electrical resistance changes in response to the magnitude of the magnetic field. Consequently, the voltage of the reproducing element 23 changes. Herewith, the control section 8 can detect the change of the magnetic field leaked from the disk D as the change of the voltage. The control section 8 performs reproduction of the signal from the change of the voltage, to thereby allow reproduction of the information to be performed.

As described above, with the near-field light head 2 according to the embodiment, it is possible to generate the near-field light R by efficiently collecting the light flux L, and to improve reliability of writing. Moreover, the near-field light R having strong light intensity can be generated in a position very close to the main magnetic pole 32, to thereby allow high density recording.

In addition, the light flux L which is introduced by the optical waveguide 4 disposed parallel to the slider 20 is collected and propagated along the substantially straight optical axis toward the other end side directed to the disk D to thereby allow the near-field light R to be generated. Therefore, the optical axes are not inclined as in the related art and lenses of which position adjustment is difficult are not needed. Thus, it is possible to generate the near-field light R by efficiently collecting the light flux L, and to efficiently heat the disk D. On this point, it is also possible to improve the reliability of writing.

In addition, since the light flux L is introduced by using the optical waveguide 4, and then is propagated through the inside of the core 40, there is no case where the light flux L is propagated through air as in the related art. Consequently, it is possible to reduce light-guiding loss as much as possible. In addition, the recording element 21, the spot-size converter 22 and the reproducing element 23 are disposed in this order on the lateral surface of the outflow end side of the slider 20, to thereby prevent each of the components other than the optical waveguide 4 from being overlapped in the thickness direction of the slider 20. Therefore, it is possible to compactly design the near-field light head 2, and to reduce the thickness of the near-field light head 2. Further, since the near-field light head 2 according to embodiment is configured so that the groove portion 41*a* is formed in the clad 41, it is possible to directly introduce the light flux L into the inside of the core 40 without passing through the clad 41 by using this groove portion 41*a*. For this reason, it is possible to introduce the light flux L with the loss being suppressed as much as possible. On this point, it is also possible to efficiently heat the disk D.

In addition, according to the information recording/reproducing device 1 of the present embodiment, the information recording/reproducing device 1 includes the above-described near-field light head 2, and thus writing reliability is high, and it is possible to accommodate high density recording and achieve high quality reproducing. In addition, at the same time, it is possible to reduce the thickness of the information recording/reproducing device 1.

In manufacturing the near-field light head 2 of the present embodiment, manufacture may be performed using semiconductor technology such as photolithography technology and etching technology. That is to say, in the case where the near-field light head 2 has the spot-size converter 22, it is possible to form the spot-size converter 22 at the same time in the flow of conventional manufacturing processes in the related art without using a particular technique.

Described specifically, the slider 20 is processed into a predetermined contour shape, and then the recording element 21 is formed on the lateral side of the outflow end side of this slider 20 using the above-mentioned semiconductor technology. Then, the spot-size converter 22 is formed on this recording element 21 similarly using the semiconductor technology. Finally, the reproducing element 23 may be formed on the spot-size converter 22. As described above, by adding only one process of manufacturing the spot-size converter 22 in the course of making each component in sequence from the slider 20 side, it is possible to easily manufacture the near-field light head 2.

In addition, in manufacturing the spot-size converter 22, first, the clad 41 is film-formed on the main magnetic pole 32. At this time, in order to connect later the optical waveguide 4 to one end side, the clad 41 is patterned to form the groove portion 41*a*. Then, the core 40 is film-formed in a convex shape on this clad 41, and then appropriate etching is performed to form the reflecting surface 40*a*, the light flux collecting portion 40*b*, and the near-field light generating portion 40*c* that has the inclined surface 40*d*. Then, the metallic film 42 is formed on the inclined surface 40*d*. Then, the clad 41 is film-formed again so as to trap the core 40 to the inside. Finally, the clad 41 is processed so that the contour shape of the clad 41 has predetermined shape. As described above, it is possible to easily manufacture the spot-size converter 22 using semiconductor technology.

(Second Embodiment)

Next, the second embodiment according to the invention will be described with reference to FIGS. 9 to 12. In this second embodiment, for the portions that are the same as the components in the first embodiment, the same symbols will be assigned and the explanation thereof will be omitted.

The difference of the second embodiment and the first embodiment is that in the first embodiment, the core 40 of the spot-size converter 22 and the main magnetic pole 32 are disposed with the clad 41 in between, but in the near-field light head 50 of the second embodiment, the core 40 is in direct contact with the main magnetic pole 32.

Figure 9:
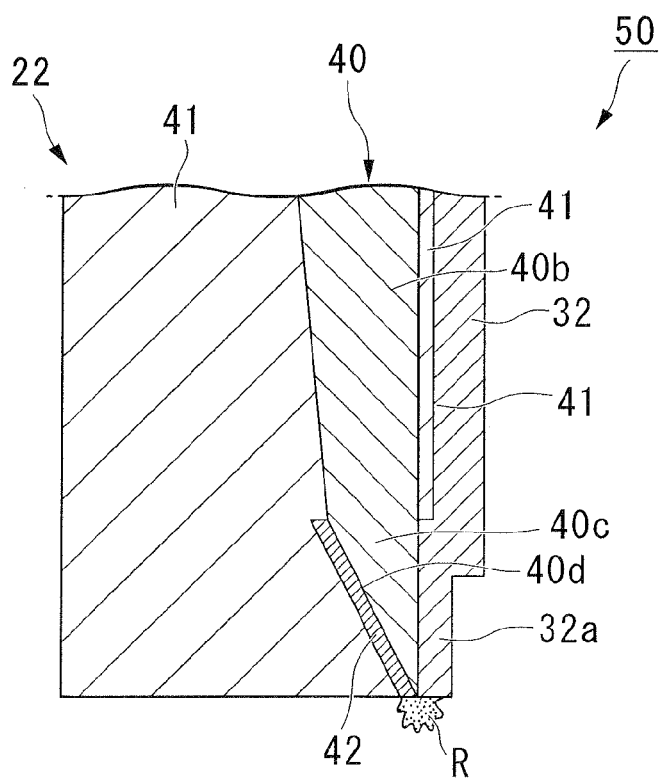
FIG. 9 is a diagram showing a second embodiment according to the invention, and is an enlarged cross-section view of a portion of the near-field light head having a main magnetic pole which comes into direct contact with the core.
Figure 10:
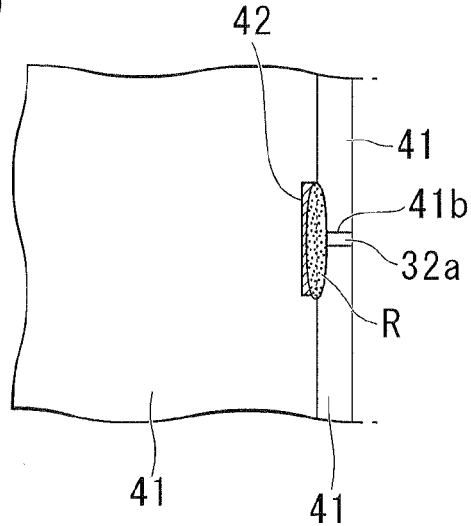
FIG. 10 is a diagram of the near-field light head shown in FIG. 9 when viewed from the disk side.

That is, as shown in FIG. 9 and FIG. 10, the groove portion 41*b* that exposes the core 40 to the side of the main magnetic pole 32 is formed in the clad 41 of the spot-size converter 22 of the present embodiment. In addition, the main magnetic pole 32 has the projecting portion 32*a* that wedges itself into this groove portion 41*b*, and is in direct contact with the core 40. Therefore, according to the near-field light head 50 of the present embodiment, it is possible to generate the near-field light R in a position that is more closely to the main magnetic pole 32. Consequently, it is possible to further efficiently make the near-field light R and the recording magnetic field cooperate with each other. As a result, it is possible to achieve higher density recording.

Figure 11:
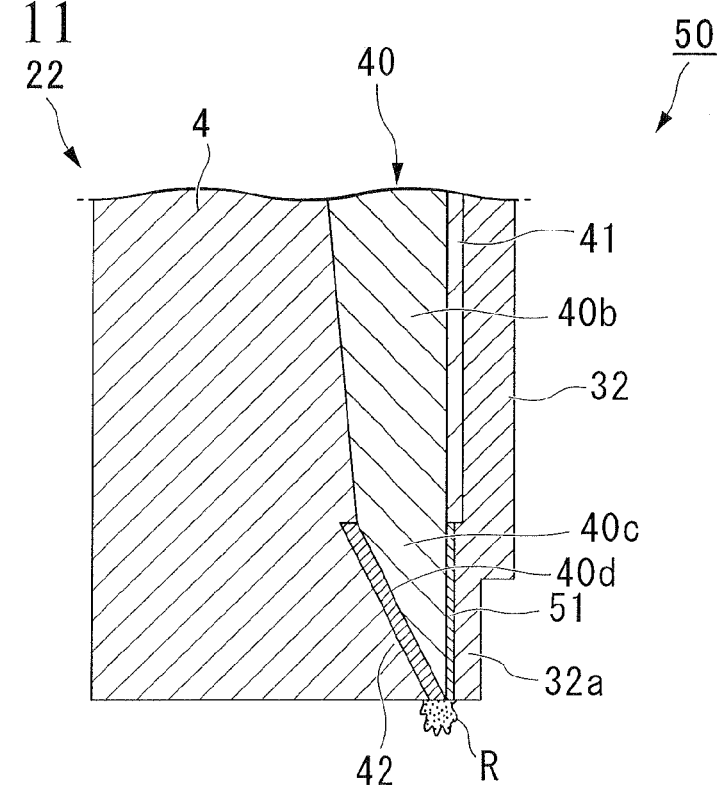
FIG. 11 is a diagram showing a modified example of the near-field light head shown in FIG. 9, and is an enlarged cross-section view of a portion of the near-field light head in which a shield film is formed between the core and the main magnetic pole.
Figure 12:
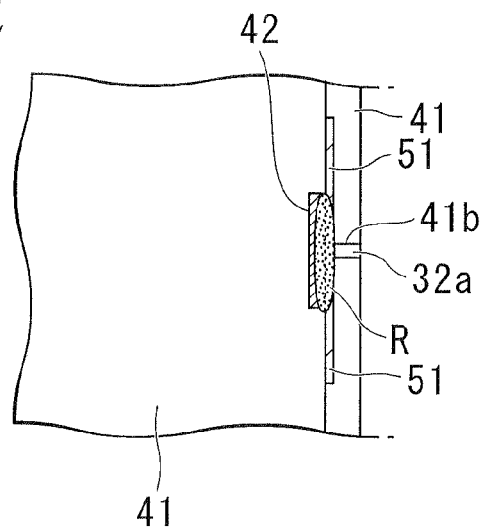
FIG. 12 is a diagram of the near-field light head shown in FIG. 11 when viewed from the disk side.

In the above-described case, a thin (for example, the film thickness of several nm to several tens of nm) shield film 51, which blocks at least any one link of the electric or magnetic links, may be formed between the projecting portion 32*a* and the core 40 in the state of being in close contact with both of them, as shown in FIG. 11 and FIG. 12.

By doing this, it is possible to isolate electrically or magnetically the core 40 side where the metallic film 42 is formed on the inclined surface 40*d*, and the main magnetic pole 32 side. Particularly, since the core 40 is formed such that the other end side has a pointed shape, the metallic film 42 and the projecting portion 32*a* of the main magnetic pole 32 brought into line-contact with each other if there is no shield film 51. However, since the shield film 51 is formed between them, it is possible to prevent direct contact of the metallic film 42 and the main magnetic pole 32. Consequently, it is possible to make the near-field light R and the recording magnetic field cooperate with each other as designed without being affected by disturbance, and to perform stable recording by the hybrid magnetic recording type.

(Third Embodiment)

Next, the third embodiment according to the invention will be described with reference to FIGS. 13 to 15. In this third embodiment, for the portions that are the same as the components in the second embodiment, the same symbols will be assigned and the explanation thereof will be omitted.

The difference of the third embodiment and the second embodiment is that in the second embodiment, the metallic film 42 is formed over the whole surface of the inclined surface 40*d*, but in the third embodiment, the metallic film 42 is formed only in a part of the inclined surface 40*d* in the near-field light head 60.

Figure 13:
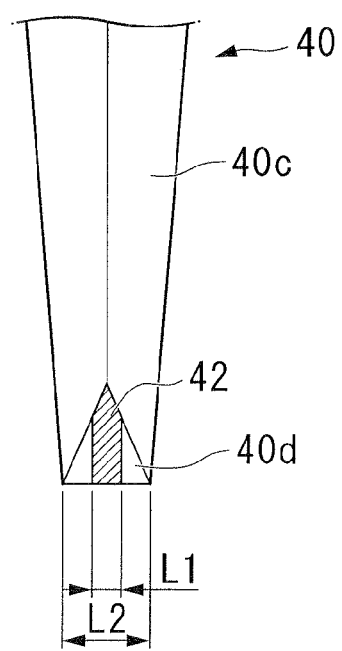
FIG. 13 is a diagram showing a third embodiment according to the invention, and is an enlarged view of the periphery of the other end side of the core where a metallic film is formed on a portion of an inclined surface.
Figure 14:
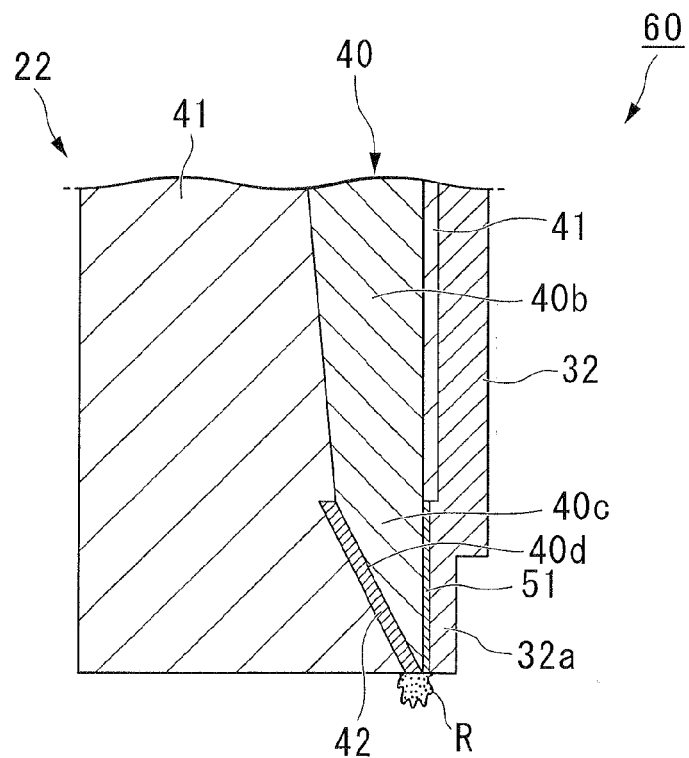
FIG. 14 is an enlarged cross-section view of a portion of the near-field light head having the core shown in FIG. 13.
Figure 15:
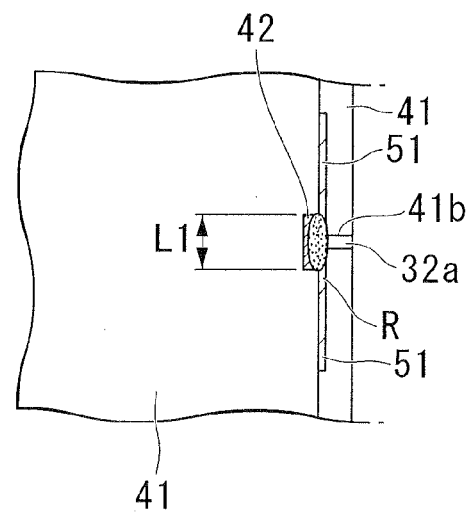
FIG. 15 is a diagram of the near-field light head shown in FIG. 14 when viewed from the disk side.

That is, the metallic film 42 of the near-field light head 60 of the present embodiment is formed not on the whole surface, but in a part of the inclined surface 40*d* as patterned substantially in a rectangular shape to have an uniform width L1 toward the other end side as shown in FIGS. 13 to 15. Therefore, the width L1 of the metallic film 42 is shorter than the length L2 of the other end side of the core 40 that is exposed to the outside. As in the case where the metallic film 42 is formed described above, since the near-field light R is generated as localized in the interface of this metallic film 42 and the near-field light generating portion 40*c*, the width of the near-field light R becomes substantially the same as the width L1 of the metallic film 42 as shown in FIG. 15. Therefore, it is possible to shorten the width of the near-field light R compared to that of the second embodiment.

Therefore, even if the track distance of the disk D is made narrow, it is possible to perform heating with no influence on the adjacent track. Consequently, it is possible to increase track density, and achieve higher density recording. Moreover, since the width of the near-field light R can be controlled not with the physical design of the core 40, but with patterning of the metallic film 42, it is possible to handle high density recording relatively simply.

Furthermore, since the width of the near-field light R can be made narrow, it is possible to concentrate and localize the near-field light R in a narrower location. Therefore, it is possible to generate stronger intensity of the near-field light R.

(Fourth Embodiment)

Next, the fourth embodiment according to the invention will be described with reference to FIG. 16 and FIG. 17. In this fourth embodiment, the same symbols will be assigned for the portions that are the same as the components in the first embodiment and the explanation thereof will be omitted.

The difference of the fourth embodiment and the first embodiment is that in the first embodiment, the recording element 21, the spot-size converter 22 and the reproducing element 23 are fixed in this order from the lateral side of the outflow end side of the slider 20, but in the near-field light head 70 of the fourth embodiment, the reproducing element 23, the recording element 21 and the spot-size converter 22 are fixed in this order from the lateral side of the outflow end side of the slider 20.

Figure 16:
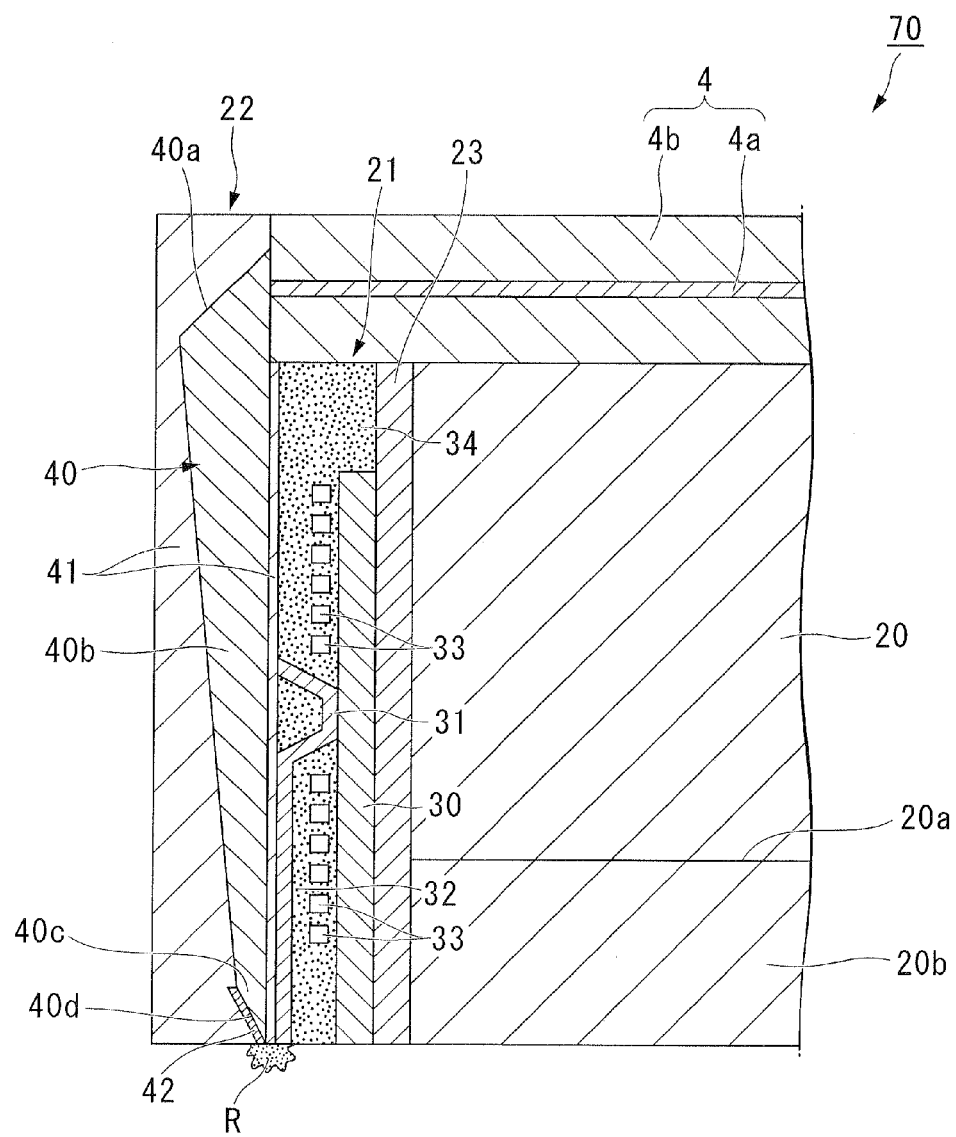
FIG. 16 is a diagram of a fourth embodiment according to the invention, and is an enlarged cross-section view of the lateral surface of the outflow end side of the near-field light head where a reproducing element is disposed between a slider and a recording element.
Figure 17:
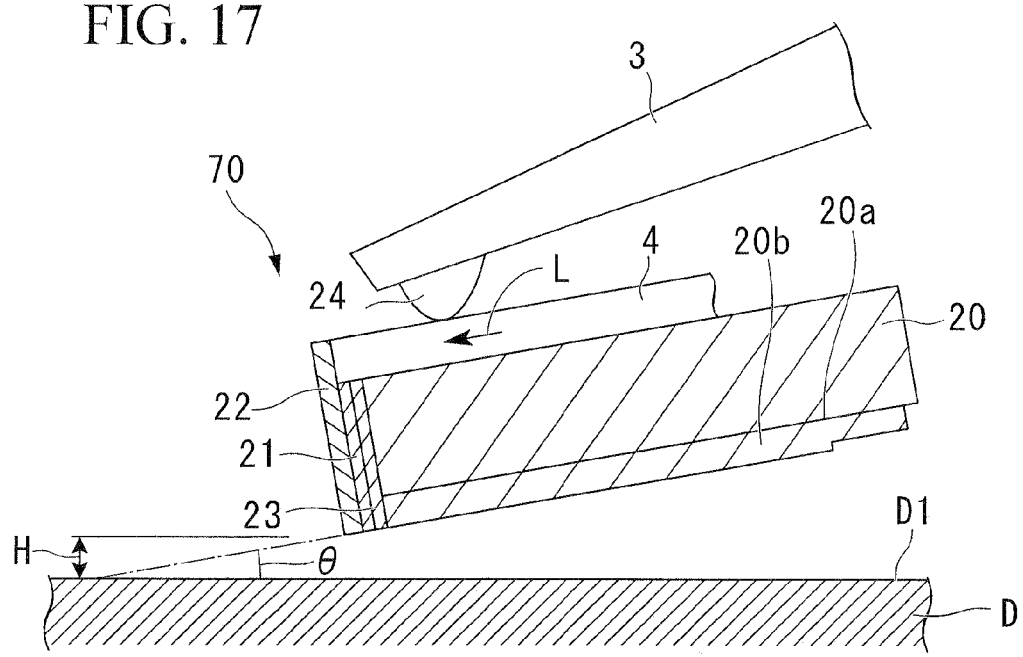
FIG. 17 is a diagram showing a state where the near-field light head shown in FIG. 16 is obliquely floating on a disk.

That is, the reproducing element 23 of the near-field light head 70 of the present embodiment is provided between the lateral side of the inflow end side of the slider 20, and the recording element 21 as shown in FIG. 16. Therefore, the spot-size converter 22 and the recording element 21 become shifted to the outflow end side of the slider 20 as much as the thickness of the reproducing element 23 compared to the first embodiment.

Herein, the posture of the slider 20 at the time of floating is described more specifically. The slider 20 is not flat but slightly inclined with respect to the disk surface D1 as shown in FIG. 17. Specifically, the slider 20 is inclined so that the angle θ of the disk surface D1 with ABS of the slider 20 is a tiny angle (for example, 1° to 5° or so) in the state where the outflow end side is close to the disk D. Therefore, as it goes from the outflow end to the inflow end of the slider 20, the distance H form the slider 20 to the disk surface D1 gradually increases. That is to say, the outflow end side of the slider 20 is in the state of being closest to the disk surface D1.

Therefore, according to the near-field light head 70 of the present embodiment, since the spot-size converter 22 and the recording element 21 are closer to the outflow end side of the slider 20, it is possible to shift the spot-size converter 22 and the recording element 21 closer to the disk surface D1 compared to the first embodiment. Therefore, it is possible to cause the spot light R and the recording magnetic field to act more efficiently with respect to the disk D, and to perform higher-density recording. In addition, other operational advantages are the same as those of the first embodiment.

(Fifth Embodiment)

Next, the fifth embodiment according to the invention will be described with reference to FIG. 18. In this fifth embodiment, for the portions that are the same as the components in the first embodiment, the same symbols will be assigned and the explanation thereof will be omitted.

The difference of the fifth embodiment and the first embodiment is that in the first embodiment, the recording element 21, the spot-size converter 22 and the reproducing element 23 are fixed in this order from the lateral side of the outflow end side of the slider 20, but in the near-field light head 80 of the fifth embodiment, the reproducing element 23 is provided as embedded in the clad 41 of the spot-size converter 22 in.

Figure 18:
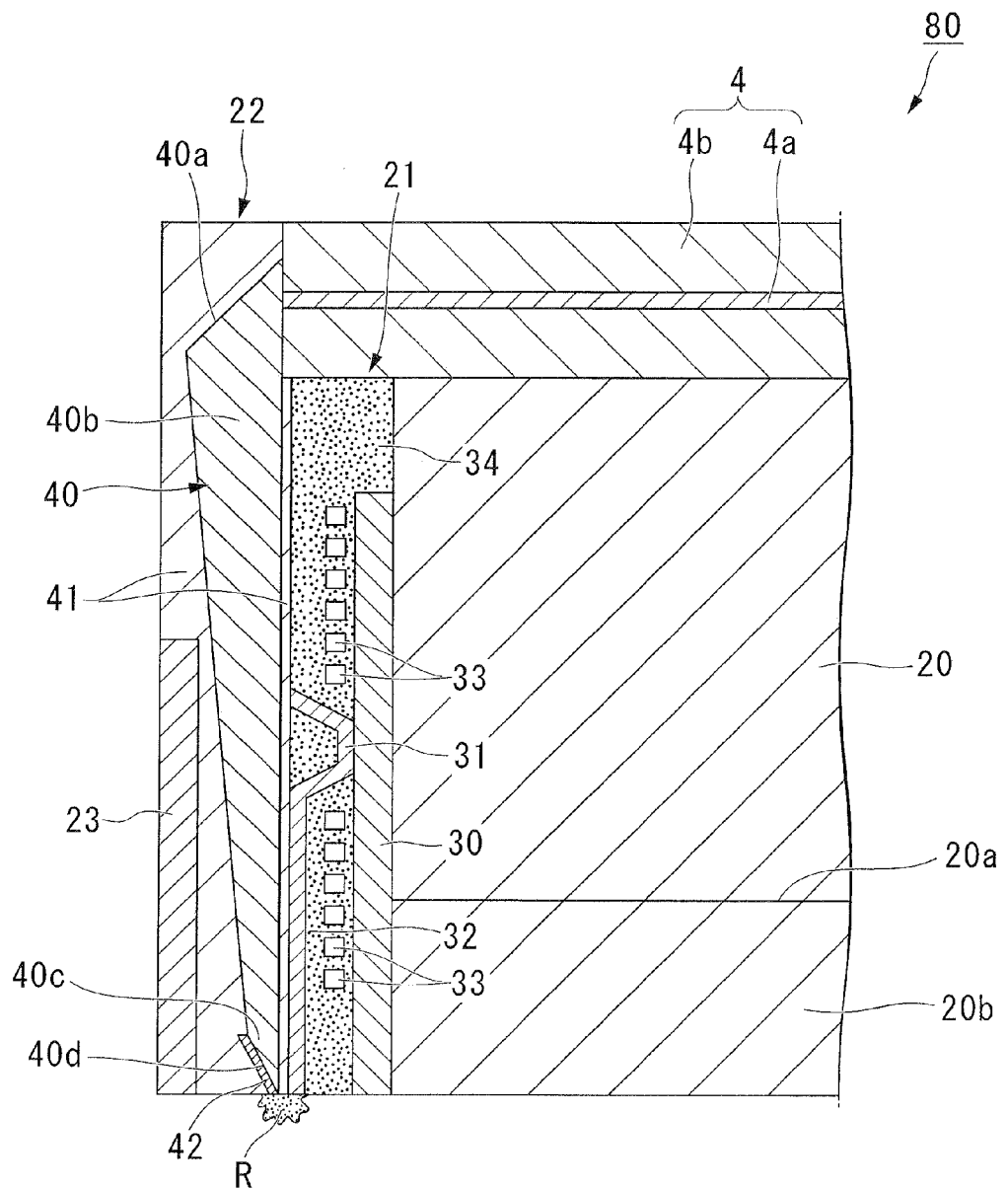
FIG. 18 is a diagram showing a fifth embodiment according to the invention, and is an enlarged cross-section view of the lateral surface of the outflow end side of the near-field light head which is disposed so as the reproducing element is embedded in a clad of the near-field light generating element.

That is, the reproducing element 23 of the near-field light head 80 of the present embodiment is embedded in a part of the clad 41 that traps the core 40 to the inside as shown in FIG. 18. Therefore, it is possible to include the thickness of the reproducing element 23 by the clad 41, and to shift the spot-size converter 22 and the recording element 21 closer to the outflow end side of the slider 20 similar to the fourth embodiment. Therefore, when the slider 20 floats as inclined, it is possible to move the spot-size converter 22 and the recording element 21 closer to the disk surface D1 compared to the first embodiment. Therefore, it is possible to cause the spot light R and the recording magnetic field to act more efficiently with respect to the disk D, and to perform higher density recording. In addition, other operational advantages are the same as those of the first embodiment.

(Sixth Embodiment)

Next, the sixth embodiment according to the invention will be described with reference to FIG. 19. In his sixth embodiment, for the portions that are the same as the components in the first embodiment, the same symbols will be assigned and the explanation thereof will be omitted.

The difference of the sixth embodiment and the first embodiment is that in the first embodiment, one end side of the core 40 is exposed to the outside via the groove portion 41a formed in the clad 41, but in the near-field light head 90 of the sixth embodiment, one end side of the core 40 is covered with the clad 41 in.

Figure 19:
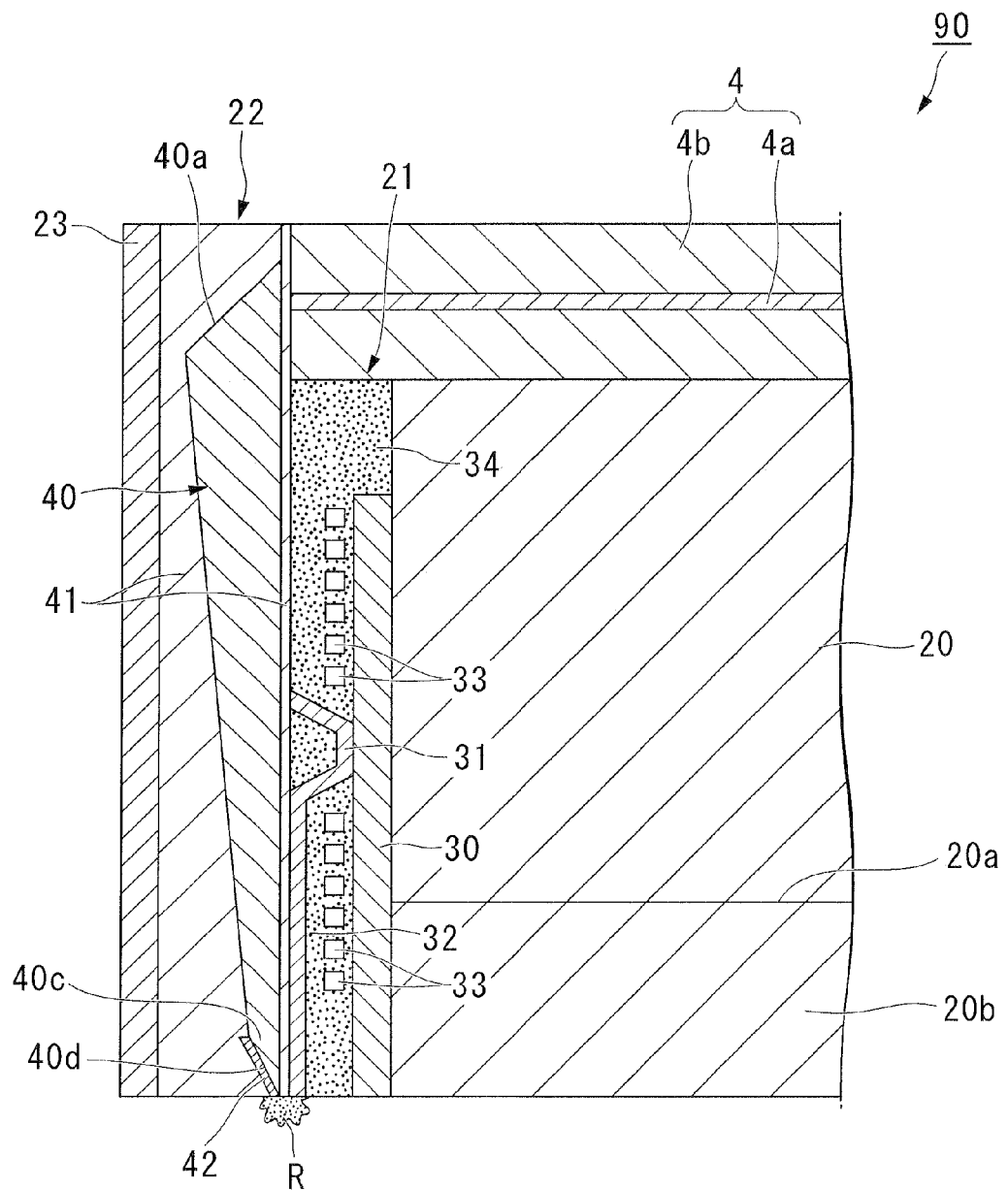
FIG. 19 is a diagram showing a sixth embodiment according to the invention, and is an enlarged cross-section view of the lateral surface of the outflow end side of the near-field light head in which one end side of the core of the near-field light generating element is covered with a clad.

That is, in the spot-size converter 22 of the near-field light head 90 of the present embodiment, one end side of the core 40 is covered with the clad 41 as shown in FIG. 19. Consequently, the light flux L that has proceeded in the core 40 of the optical waveguide 4 passes through the clad 41, and then is introduced into the core 40 of the spot-size converter 22. Also in the case of the present embodiment, it is possible to exert similar operational advantages to those of the first embodiment. In addition to this, in manufacturing the spot-size converter 22 of the present embodiment, the clad 41 is not necessarily patterned so as to expose one end side of the core 40, which is different from that of the first embodiment. Therefore, it has an advantage of easy and efficient manufacturing in a shorter time.

In addition, the technical scope of the invention is not limited to the above-mentioned embodiments, and various modifications may be added without departing from the spirit of the invention.

For example, in each of the above-mentioned embodiments, the information recording/reproducing device 1 of the air float type, in which the near-field light head is floated, has been described for example. However, the present invention is not limited to this case, and the disk D and the slider 20 may be brought into contact with each other as long as they are disposed as opposite to the disk surface D1. That is to say, the near-field light head relating to the invention may be a head of the contact slider type. Also in this case, it is possible to exert similar operational advantages.

In addition, in each of the above-mentioned embodiments, the case has been described for example, in which the light flux L from the light signal controller 5 is led with the optical waveguide 4, and incident to the core 40, wherein the optical waveguide 4 is used as the light flux introduction device. However, the present invention is not limited to this case, and the present invention may be constituted such that the laser light (light flux) is directly introduced into the core 40, wherein the light flux introduction device is used as a laser light source.

One example of the near-field light head in this case will be described with reference to FIG. 20. In this example, for the portions that are the same as the components in the first embodiment, the same symbols will be assigned and the explanation thereof will be omitted.

Figure 20:
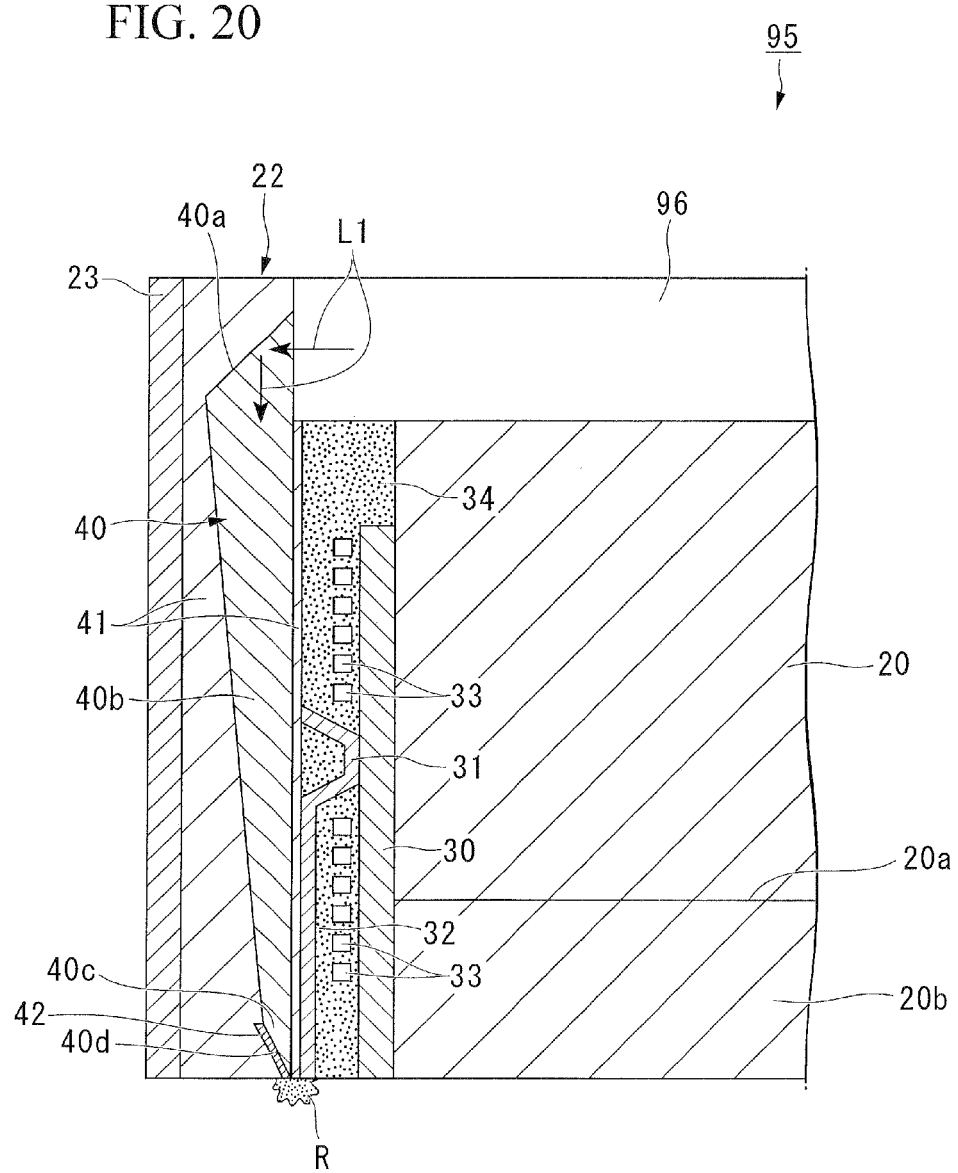
FIG. 20 is a diagram showing a modified example according to the invention, and is an enlarged cross-section view of the near-field light head which introduces light flux into the core by using a laser light source.

As shown in FIG. 20, this near-field light head 95 includes the laser light source 96 instead of the optical waveguide 4, which is fixed to the upper surface of the slider 20. In this case, the laser light source 96 is disposed in parallel with respect to the slider 20, and irradiates the laser light L1 toward the inclined surface 40a of the core 40.

Also with the near-field light head 95 constituted as described above, it is possible to exert similar operational advantages to those of the first embodiment. In the case of the above-described constitution, the laser light source 96 can introduce the laser light L1 directly into the core 40, and thus the light signal controller 5, which is necessary in the first embodiment, is not necessary. Therefore, it is possible to reduce the number of components, and leading to a simple constitution. In addition, in this case, the control section 8 may be designed to control the operation of the laser light source 96 and thus control the incident timing of the laser light L1.

Figure 21:
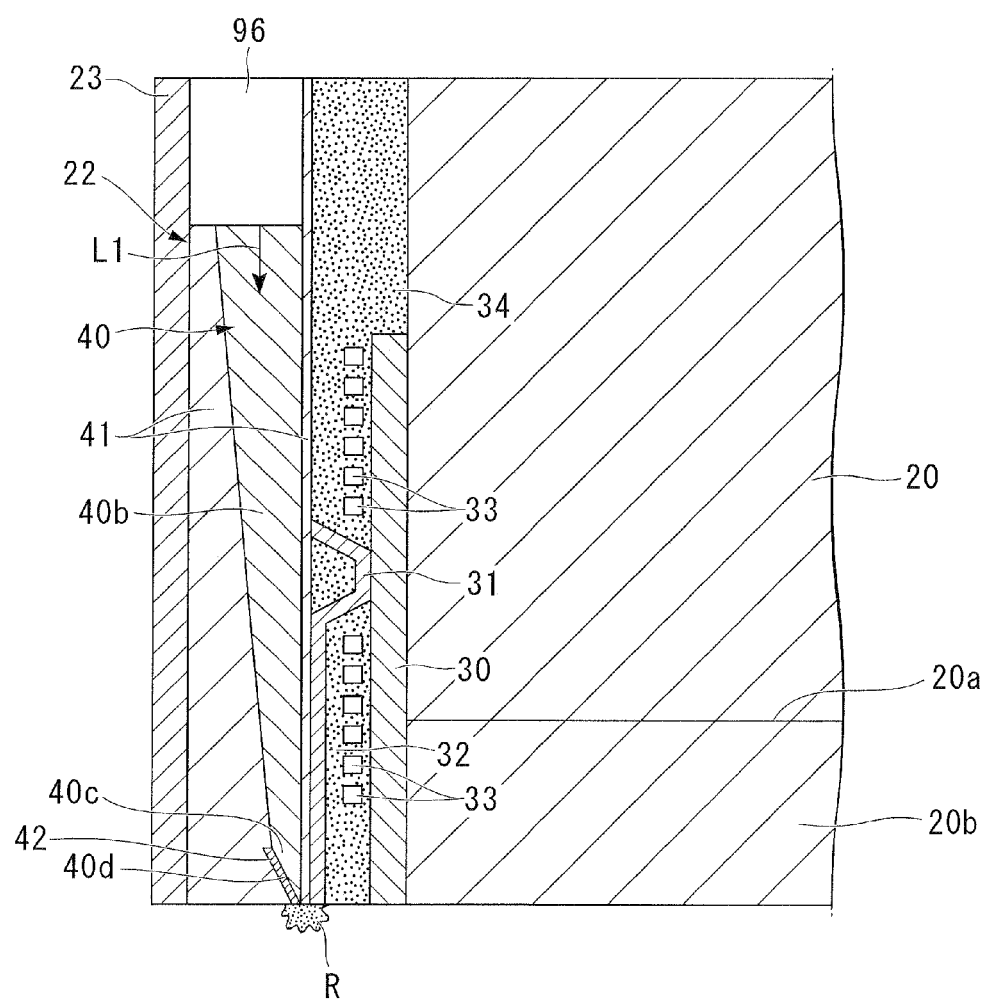
FIG. 21 is a diagram showing a modified example according to the invention, and is an enlarged cross-section view of the near-field light head which introduces light flux substantially vertically into the core by using the laser light source.

Furthermore, in the case where the laser light source 96 is used, the laser light source 96 is not limited to the constitution of being fixed to the upper surface of the slider 20. For example, the present invention may be constituted such that the laser light source 96 is disposed on the upper portion of the spot-size converter 22 like the near-field light head 97 shown in FIG. 21, and is fixed to the slider 20 via the spot-size converter 22 and the recording element 21.

Since the laser light source 96 in this case is disposed vertically, the laser light L1 is irradiated substantially vertically from directly above and is introduced into the core 40. In addition, in this case, since the reflecting surface 40a is not necessary, the core 40 may be constituted with the light flux collecting portion 40b and the near-field light generating portion 40c.

Also with the near-field light head 97 constituted as described above, it is possible to exert similar operational advantages to those of the first embodiment. In addition, the second to sixth embodiments may be constituted to use the laser light source 96 as described above.

In addition, in each of the above-mentioned embodiments, the spot-size converter 22 that has the triangular columnar core 40, in which the light flux collecting portions 40b are formed on three lateral sides, has been described for example. However, the shape of the core 40 is not limited to this shape. That is to say, the shape of the core 40 may be any shape as long as it can propagate the light flux introduced from one end side toward the other end side.

Figure 22:
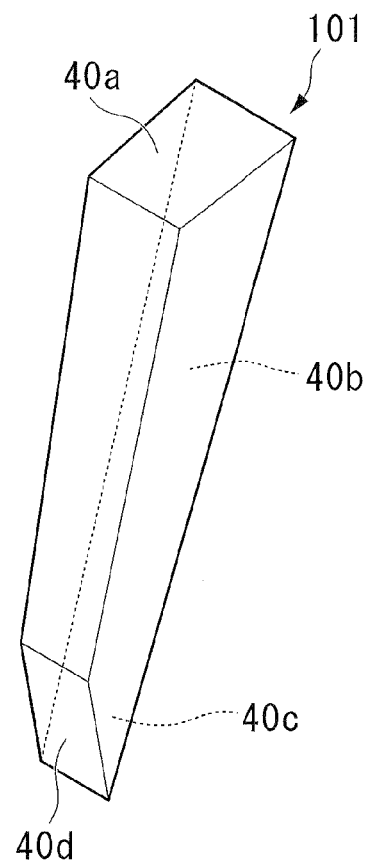
FIG. 22 is a perspective view showing a modified example of the core of the near-field light generating element according to the invention.
Figure 23:
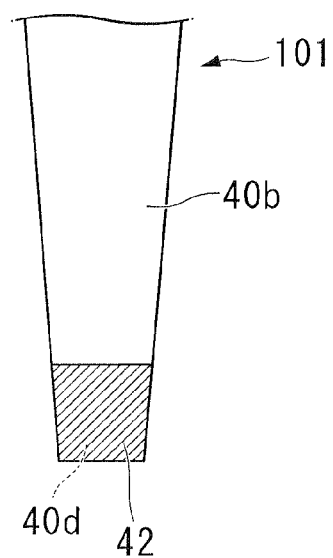
FIG. 23 is a diagram showing a state where a metallic film is formed on an inclined surface of the core shown in FIG. 22.
Figure 24:
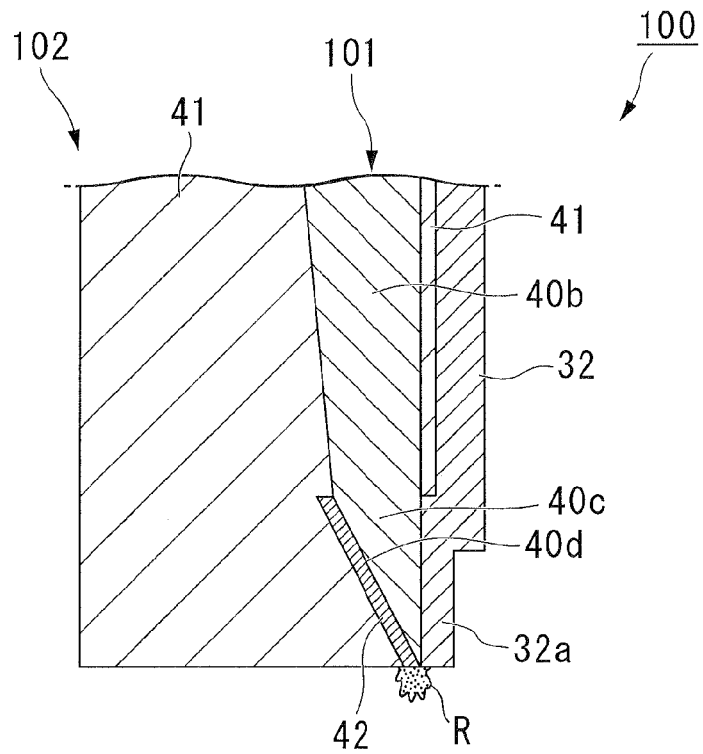
FIG. 24 is an enlarged cross-section view of a portion of the near-field light head having the core shown in FIG. 23.
Figure 25:
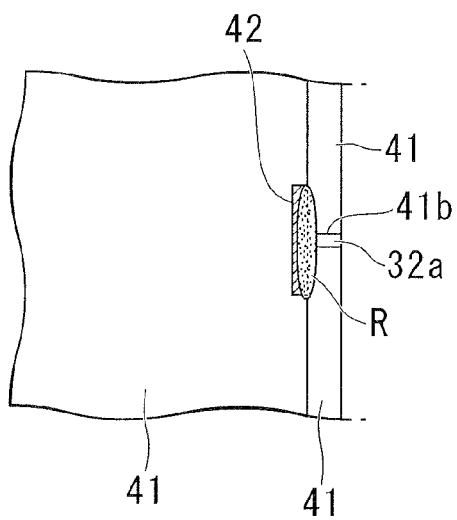
FIG. 25 is a diagram of the near-field light head shown in FIG. 24 when viewed from the disk side.

For example, as shown in FIG. 22, the spot-size converter may include the core 101 formed in a substantially square column shape. The near-field light head 100 that has a spot-size converter (near-field light generating element) 102 comprising the core 101 constituted as described above, is shown in FIGS. 23 to 25. As in the case where the projecting portion 32a of the main magnetic pole 32 and the core 101 are in direct contact like the second embodiment is shown for example. Also with the near-field light head 100 constituted as described above, it is possible to exert similar operational advantages to those of the second embodiment.

Figure 26:
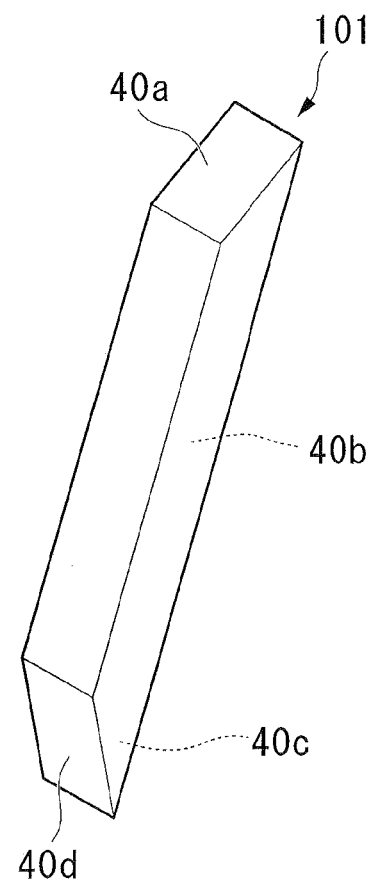
FIG. 26 is a perspective view showing another modified example of the core of the near-field light generating element according to the invention.

The core 111 may be constituted as shown in FIG. 26. This core 111 is formed such that the light flux collecting portion 40b is not formed to be gradually squeezed from one end side where the reflecting surface 40a is formed, toward the other end side where the inclined surface 40d is formed, but formed in a straight shape.

Also with the core 111 constituted as described above, it is possible to propagate introduced light flux L from one end side toward the other end side, and to generate the near-field light R having strong light intensity from the other end side.

Figure 27:
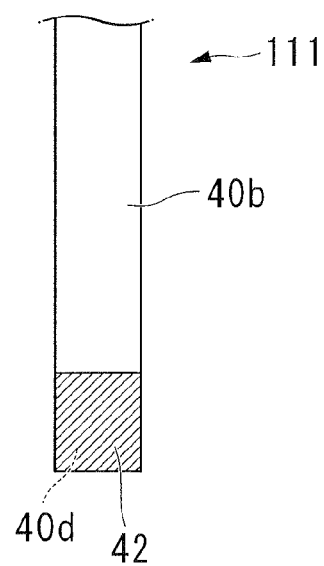
FIG. 27 is a diagram showing a state where the metallic film is formed on the inclined surface of the core shown in FIG. 26.
Figure 28:
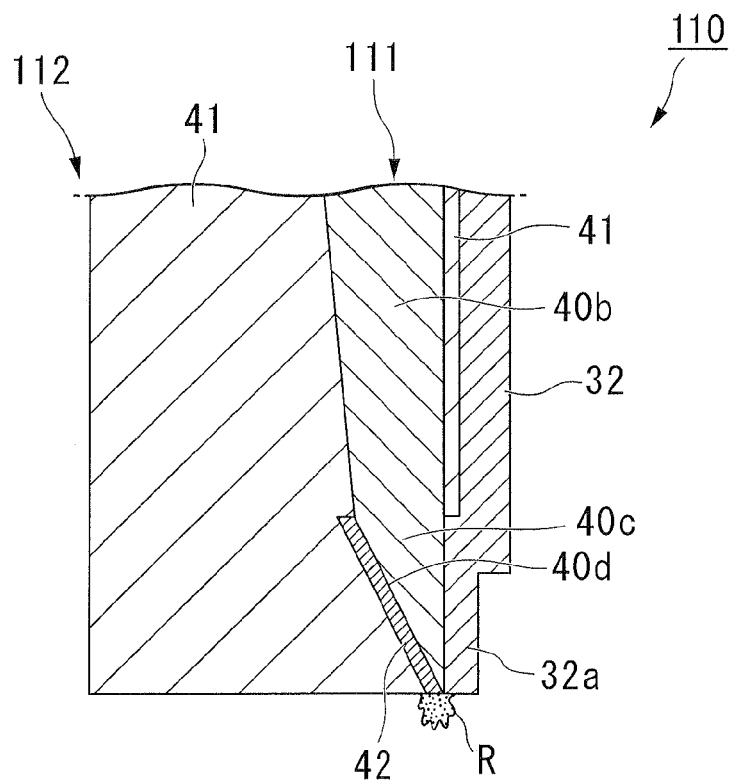
FIG. 28 is an enlarged cross-section view of a portion of the near-field light head having the core shown in FIG. 27.
Figure 29:
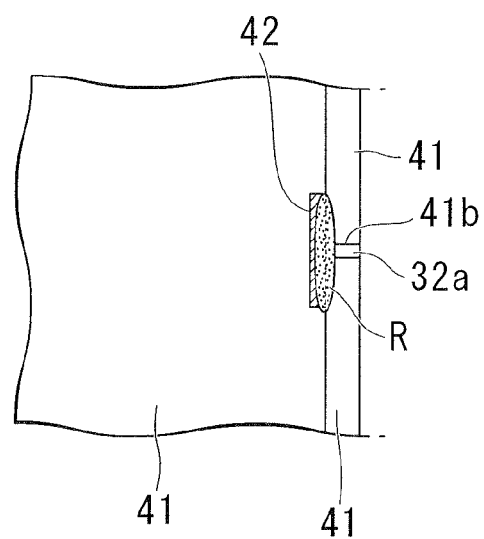
FIG. 29 is a diagram of the near-field light head shown in FIG. 28 when viewed from the disk side.

Herein, a near-field light head 110 that has a spot-size converter 112 comprising this core 111 is shown in FIGS. 27 to 29. Like the second embodiment, the case is shown for example where the projecting portion 32a of the main magnetic pole 32 and the core 111 are in direct contact.

Also with the near-field light head 110 constituted as described above, it is possible to exert similar operational advantages to those of the second embodiment. That is to say, also with the core 111 where the light flux collecting portion 40b is formed in a straight shape, and not formed as gradually squeezed from one end side toward the other end side as a whole, it is possible to accomplish the object of the invention.

Figure 30:
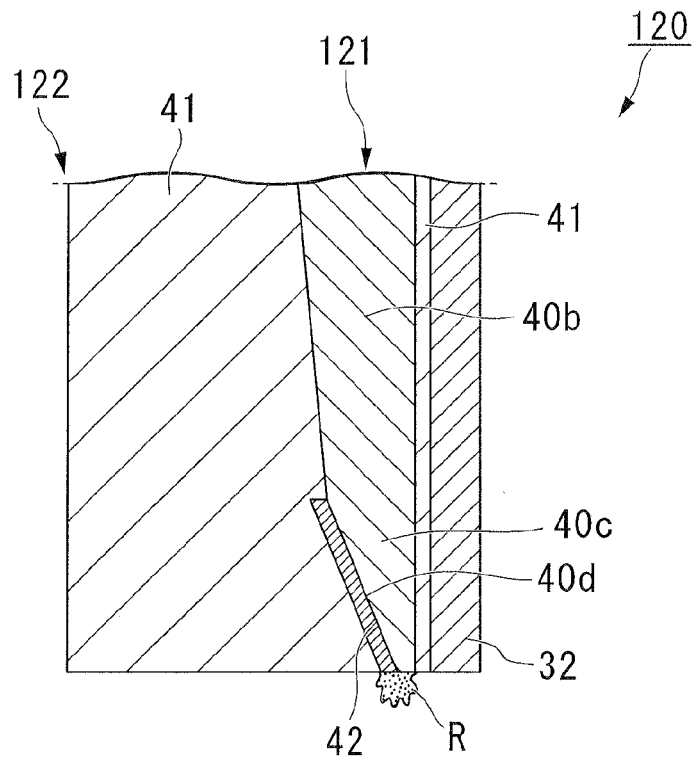
FIG. 30 is a diagram showing a modified example of the near-field light head according to the invention, and is an enlarged cross-section view of a portion of the near-field light head having a core where an end surface is formed on the other end side.
Figure 31:
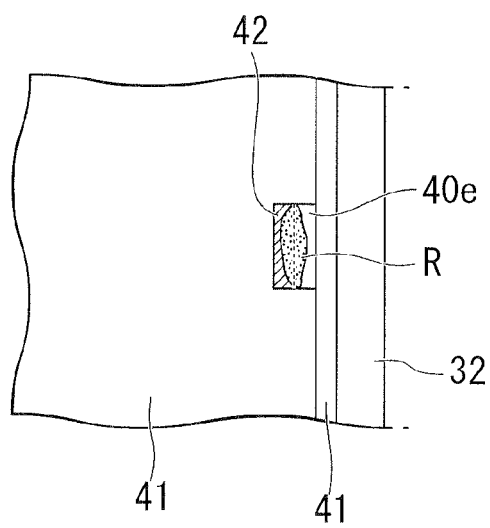
FIG. 31 is a diagram of the near-field light head shown in FIG. 30 when viewed from the disk side.

In each of the above-mentioned embodiments, the core that has the other end side in a pointed shape has been described for example. However, the core may be a core 121 that is formed such that an end surface 40e is exposed to the other end side by adjusting the angle of the inclined surface 40d as shown in FIG. 30 and FIG. 31. Also with a near-field light head 120 that has a spot-size converter (near-field light generating element) 122 comprising the core 121 constituted as described above, it is possible to exert similar operational advantages.

Figure 32:
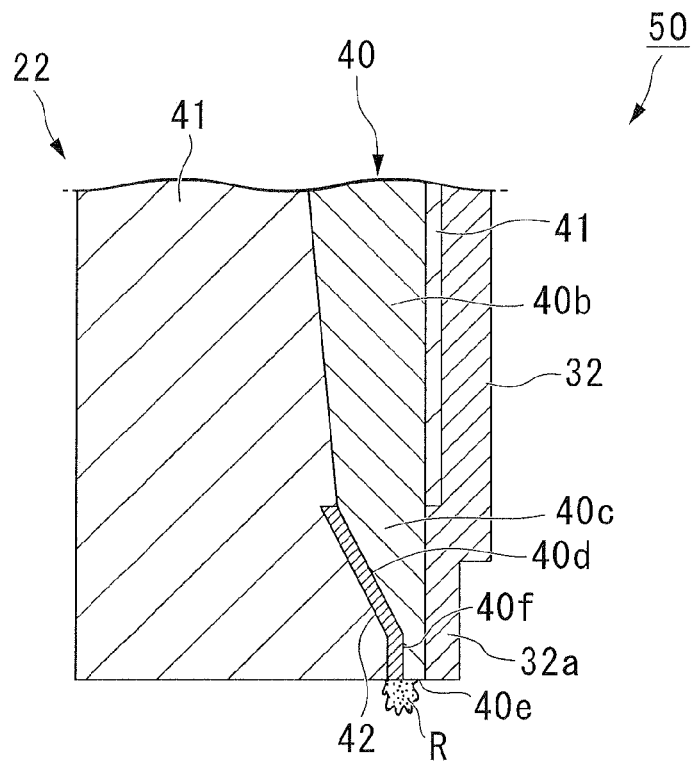
FIG. 32 is a diagram showing a modified example of the near-field light head according to the invention, and is an enlarged cross-section view of a portion of the near-field light head having a core where a vertical surface is integrally formed on the inclined surface.
Figure 33:
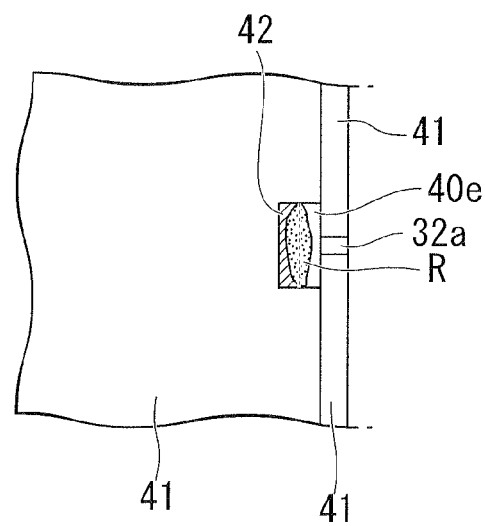
FIG. 33 is a diagram of the near-field light head shown in FIG. 32 when viewed from the disk side.

In addition, in each of the above-mentioned embodiments, the inclined surface 40d is extended to the other end side of the core 40. However, as shown in FIG. 32 and FIG. 33, a vertical surface 40f that is substantially vertical to the disk surface D1 may be formed integrally on the inclined surface 40d. FIG. 32 and FIG. 33 show the second embodiment where the projecting portion 32a of the main magnetic pole 32 and the core 40 are in direct contact.

As described above, by integrally forming the vertical surface 40f on the inclined surface 40d, the core 40 is formed such that the other end side has a substantially straight shape, and the end surface 40e becomes exposed. Also in this case, the metallic film 42 is somewhat separated from the projecting portion 32a of the main magnetic pole 32 as much as the width of the end surface 40e. However, it is possible to generate the near-field light R around the projecting portion 32a, and to exert similar operational advantages.

Particularly, in this case, although the end surface 40e side (the lower surface in FIG. 32) is subject to the grinding process in manufacturing the spot-size converter 22, the other end side of the core 40 has a substantially straight shape, and thereby the grinding process can be performed while maintaining the same shape (maintaining constant the open state of the other end side of the core 40). Therefore, an easy and simple process may be performed while maintaining the quality.

In addition, in each of the above-mentioned embodiments, the spot-size converter is constituted with the core and the clad. However, the spot-size converter may be constituted with others than the core and the clad as long as it is possible to propagate the light flux from one end side toward the other end side to generate the near-field light, and radiate this near-field light from the other end side to the outside.

In addition, in constituting the spot-size converter with the core and the clad, this spot-size converter may be designed in a hollow shape. In this case, the air portion that becomes hollow functions as a core, and the portion that surrounds the core functions as a clad. Also in this case, it is possible to perform propagation of the light flux and production of the near-field light, and exert similar operational advantages. In addition, in this case, a part of the clad may be inclined to be the inclined surface.

What is claimed is:

1. A near-field light head that generates near-field light from introduced light flux to heat a magnetic recording medium rotating in a given direction, and gives rise to magnetization reversal by providing a recording magnetic field of a vertical direction with respect to the magnetic recording medium, to thereby cause information to be recorded, the near-field light head comprising:
   a slider disposed opposite to a surface of the magnetic recording medium;
   a recording element that includes a main magnetic pole generating the recording magnetic field and a subsidiary magnetic pole, the recording element being fixed to an apical surface of the slider so that the main magnetic pole and the subsidiary magnetic pole line up in a longitudinal direction of the slider in a state where the subsidiary magnetic pole is located at the apical surface of the slider;
   a near-field light generating element, fixed adjacently to the main magnetic pole in a state where another end side thereof is directed to the magnetic recording medium, that propagates the light flux introduced from one end side thereof toward the other end side to generate the near-field light, and radiates the near-field light from the other end side to the outside, the near-field light generating element including: a core that propagates the light flux from the one end side to the other end side, and a clad that traps the core in an inside thereof with the other end side of the core being exposed; and
   a light flux introducing device, fixed to the slider, that introduces the light flux from the one end side into the near-field light generating element, wherein the core includes an inclined surface in the other end side, the core includes ends which are surrounded by the clad, the inclined surface is inclined with respect to an optical axis of the light flux propagated through an inside thereof, and a distance between the inclined surface and the main magnetic pole gradually decreases in a light propagation direction from the one end side of the near-field light generating element to the other end side thereof, wherein a metallic film that increases light intensity of the near-field light is formed on the whole surface of the inclined surface so as to cover over a surface including the ends of the core, wherein the metallic film is sandwiched between the clad and the inclined surface, and wherein a width of the core is the same as a width of the metallic film at the end of the core.

2. The near-field light head according to claim 1, wherein a groove portion exposing the core to the main magnetic pole side is formed in the clad, and the main magnetic pole includes a projecting portion which is in contact with the core via the groove portion.

3. The near-field light head according to claim 2, wherein a shield film, which blocks at least one of electric or magnetic links, is formed between the projecting portion and the core in the state of being in close contact with the projecting portion and the core.

4. The near-field light head according to claim 1, wherein the clad is formed in a state where one end side of the core is exposed to the outside.

5. The near-field light head according to claim 1, further comprising a reproducing element that outputs an electrical signal in response to a magnitude of magnetic field leaked from the magnetic recording medium.

6. The near-field light head according to claim 5, wherein the reproducing element is provided between the slider and the recording element.

7. The near-field light head according to claim 5, wherein the reproducing element is embedded in the near-field light generating element.

8. An information recording/reproducing device comprising:
   the near-field light head according to claim 1;
   a beam that is movable in a direction parallel to the surface of the magnetic recording medium, and supports the near-field light head in an apex side thereof in a state of being pivotally movable around two axes parallel to a surface of the magnetic recording medium and orthogonal to each other;
   an actuator that supports a base end side of the beam, and moves the beam toward a direction parallel to the surface of the magnetic recording medium;
   a rotary drive section that rotates the magnetic recording medium in a given direction; and
   a control section that controls an incident timing of the light flux and the recording element.

9. The near-field light head according to claim 1, wherein the metallic film is disposed between the clad and the core.

* * * * *